US009294950B2

(12) United States Patent
Futaki et al.

(10) Patent No.: US 9,294,950 B2
(45) Date of Patent: Mar. 22, 2016

(54) RADIO COMMUNICATION SYSTEM AND METHOD, RADIO TERMINAL, RADIO STATION, AND OPERATION ADMINISTRATION AND MAINTENANCE SERVER APPARATUS

(75) Inventors: Hisashi Futaki, Tokyo (JP); Motoki Morita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/822,890

(22) PCT Filed: Sep. 20, 2011

(86) PCT No.: PCT/JP2011/071390
§ 371 (c)(1),
(2), (4) Date: Mar. 13, 2013

(87) PCT Pub. No.: WO2012/043307
PCT Pub. Date: Apr. 5, 2012

(65) Prior Publication Data
US 2013/0170362 A1    Jul. 4, 2013

(30) Foreign Application Priority Data
Oct. 1, 2010    (JP) ................................. 2010-224389

(51) Int. Cl.
| | |
|---|---|
| *H04W 4/00* | (2009.01) |
| *H04W 24/10* | (2009.01) |
| *H04W 24/02* | (2009.01) |
| *H04W 16/32* | (2009.01) |
| *H04W 84/04* | (2009.01) |

(52) U.S. Cl.
CPC .............. *H04W 24/10* (2013.01); *H04W 24/02* (2013.01); *H04W 16/32* (2013.01); *H04W 84/045* (2013.01)

(58) Field of Classification Search
USPC .................................. 370/310–350, 431–546
See application file for complete search history.

(56) References Cited

U.S. PATENT DOCUMENTS

| | | | |
|---|---|---|---|
| 8,259,601 B2* | 9/2012 | Fu ................................. | 370/252 |
| 8,437,764 B2* | 5/2013 | Doettling et al. ............. | 455/446 |

(Continued)

FOREIGN PATENT DOCUMENTS

| | | |
|---|---|---|
| CN | 101810023 B | 8/2010 |
| WO | 2009/123658 A1 | 10/2009 |
| WO | 2010038839 A1 | 4/2010 |
| WO | 2010061628 A1 | 6/2010 |

OTHER PUBLICATIONS

The Extended European Search Report for EP Application No. 11828864.6 dated on Feb. 6, 2014.

(Continued)

*Primary Examiner* — Kwang B Yao
*Assistant Examiner* — Juvena Loo

(57) ABSTRACT

A system includes: first and second radio stations (eNB1,2) of a similar type and/or a third radio station (HeNB) of a different type, a radio terminal (UE) served by the eNB1; and an operation administration and maintenance server (OAM/SON server), wherein the eNB1 instructs the UE to measure interference from at least one of the second or third radio stations, the eNB1 and/or OAM/SON server receives a report of a measurement result by the UE, determines whether or not a change is to be made to the radio network configuration of the relevant radio station that is at least one of the first to third radio stations, and/or executes a change of the radio network configuration.

23 Claims, 12 Drawing Sheets

(56) References Cited

U.S. PATENT DOCUMENTS

| | | | |
|---|---|---|---|
| 8,483,745 B2* | 7/2013 | Furueda et al. | 455/525 |
| 8,599,705 B2* | 12/2013 | Agrawal et al. | 370/252 |
| 8,660,568 B2* | 2/2014 | Lee et al. | 455/450 |
| 8,705,506 B2* | 4/2014 | Khandekar et al. | 370/341 |
| 8,717,983 B2* | 5/2014 | Wei et al. | 370/329 |
| 2004/0082327 A1* | 4/2004 | Kim et al. | 455/435.2 |
| 2009/0253421 A1 | 10/2009 | Camp, Jr. et al. | |
| 2010/0039948 A1 | 2/2010 | Agrawal et al. | |
| 2010/0208707 A1 | 8/2010 | Hamabe et al. | |
| 2011/0013600 A1* | 1/2011 | Kim et al. | 370/332 |
| 2011/0312328 A1* | 12/2011 | Choi et al. | 455/450 |
| 2012/0157110 A1* | 6/2012 | Stjernholm et al. | 455/450 |

OTHER PUBLICATIONS

The international search report for PCT/JP2011/071390 mailed on Oct. 18, 2011.

Huawei, Self-configuration considerations of Home NodeB, [online]. 3GPP TSG RAN WG3 meeting #57, Aug. 24, 2007, R3-071466, [retrieved on Oct. 6, 2011]. Retrieved from the Internet: <URL:http://www.3gpp.org/ftp/tsg ran/WG3_lu/TSGR3_57/Docs/R3-071466.zip>.
3GPP TS36.300 v9.4.0(Jun. 2010).
3GPP TR36.902 v9.2.0(Jun. 2010).
NGMN Informative List of Son Use Cases (Release Date: Apr. 17, 2007).
Janna Laiho, Achim Wacker, Tomas Novosad, "Radio Network Planning and Optimization for UMTS", John Wiley & Sons, (2006), pp. 422-423, 2002.
R2-105238 (3GPP TS37.320 v1.0.0 (Aug. 2010)).
3GPP TS36.304 v9.3.0 Internet(Jun. 2010).
3GPP TR21.905 v10.2.0 Internet(Mar. 2010).
Chinese Office Action for CN Application No. 201180047772.5 issued on Feb. 28, 2015 with English Translation.

* cited by examiner

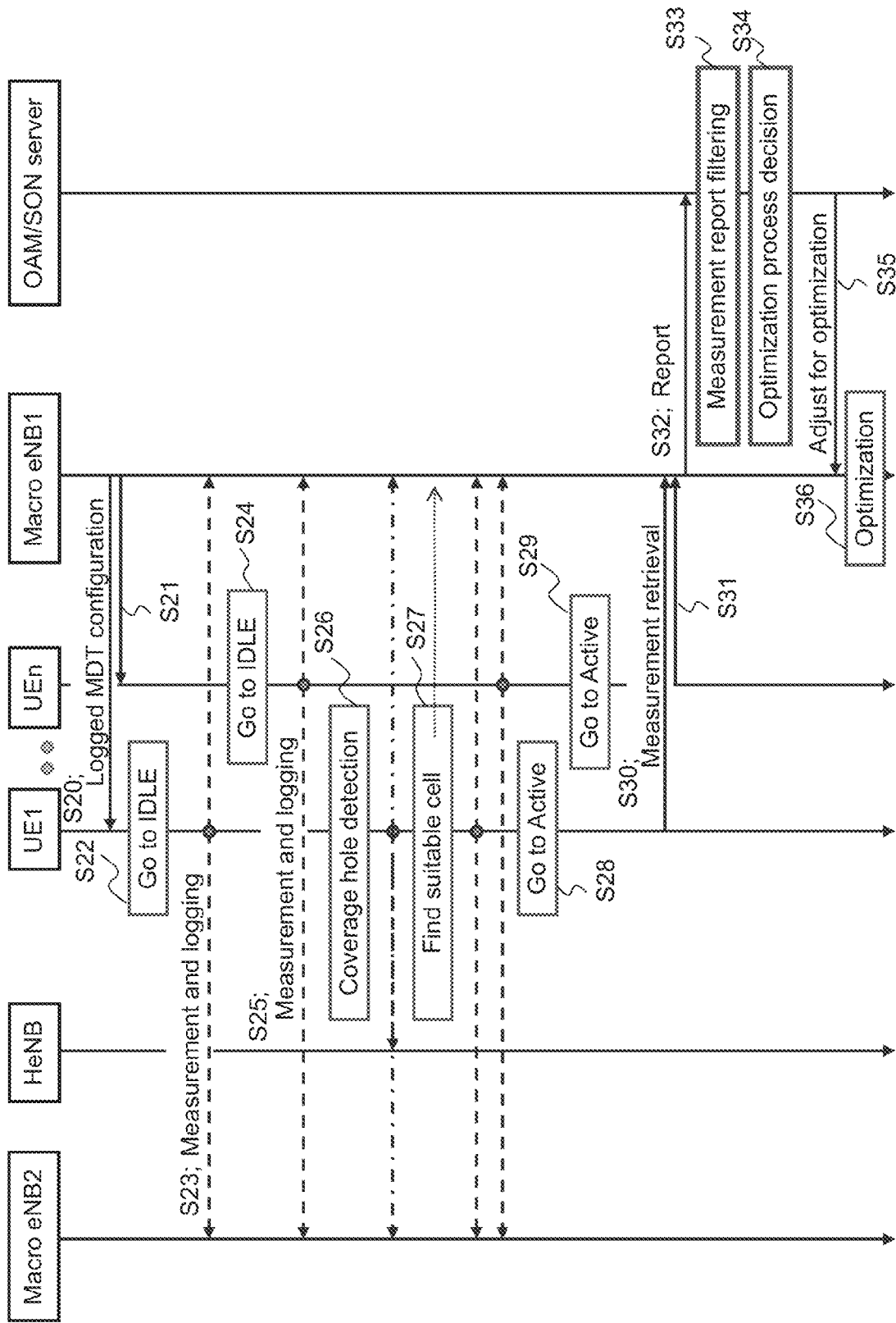

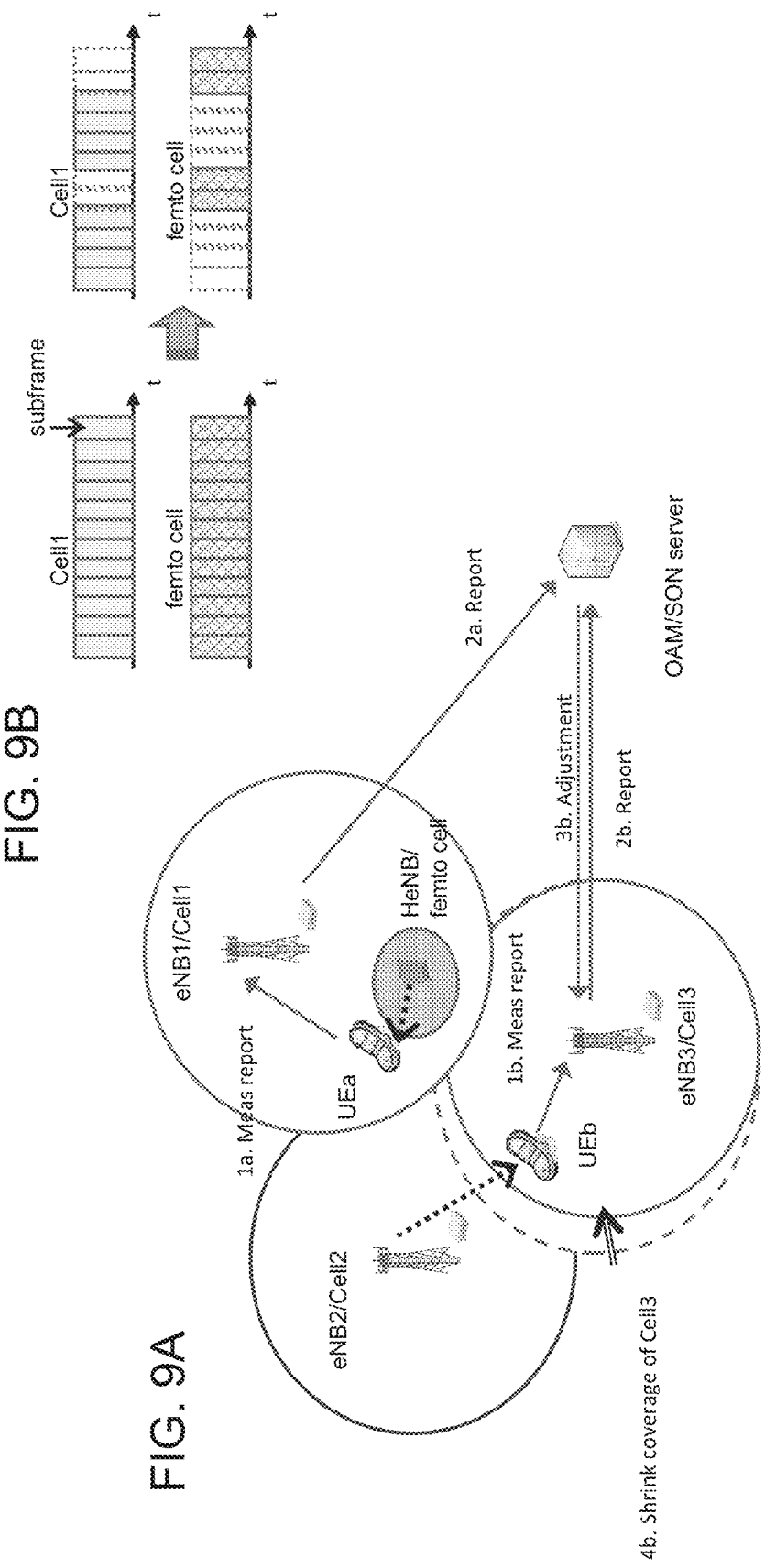
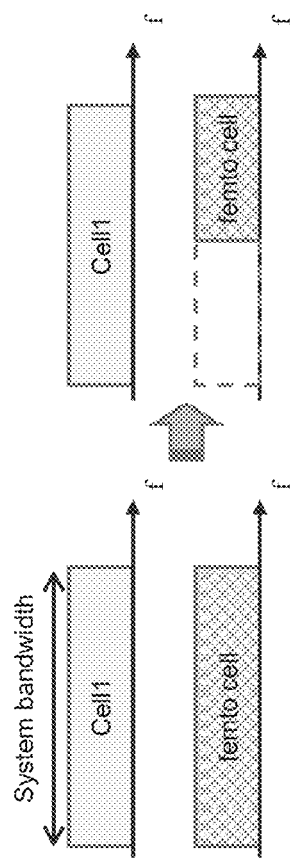
FIG. 9A
FIG. 9B
FIG. 9C

RADIO COMMUNICATION SYSTEM AND METHOD, RADIO TERMINAL, RADIO STATION, AND OPERATION ADMINISTRATION AND MAINTENANCE SERVER APPARATUS

REFERENCE TO RELATED APPLICATION

The present application is a national stage entry of PCT/JP2011/071390 filed Sep. 20, 2011, which claims priority from Japanese Patent Application No. JP2010-224389 (filed on Oct. 1, 2010) the content of all of which is hereby incorporated in its entirety by reference into this specification.

TECHNICAL FIELD

The present invention relates to a communication system, and in particular to a preferable radio communication system, method, and apparatus to be applied to a system that controls coverage and interference, based on measurement performed on a radio terminal side.

BACKGROUND

In LTE (Long Term Evolution) of the 3GPP (3rd Generation Partnership Project), investigation of a SON (Self Organizing Network) is carried out from the viewpoint of reducing operation cost (OPEX: Operation Expenditure).

A SON has functions such as self-configuration, self-optimization, and self-healing, and technology is being investigated in related fields in order to realize different respective objects thereof (Non Patent Literatures 1, 2 and 3).

In SON technology, coverage (cell size), capacity, interference, cell topology, frequency allocation, bandwidth, and the like are automatically changed, set, and optimized.

Examples of radio parameters for implementing these include:

transmission power of radio base station (which may be abbreviated to eNodeB or eNB: evolved Node B or enhanced Node B, or simply "base station"),
antenna tilt angle of radio base station,
neighboring cell information, and
handover parameter,
wherein in order to realize the objects as described above, one or more of these radio parameters is changed as appropriate at the radio base station or operation administration and maintenance server (OAM server or SON server).

First, the following describes the related technology regarding coverage optimization. FIG. 10 is a diagram illustrating the related technology of optimization of coverage between macro cells. In FIG. 10, macro cell radio base stations (eNB1, eNB2) are connected to an operation administration and maintenance server (OAM/SON server). A certain radio terminal (known as UE: User Equipment) resides in a macro cell (Cell1), and performs communication with the radio base station 1 (eNB1).

The eNB1 gives an instruction to the UE to measure received quality of a downlink reference signal (which is a known signal and also termed as "pilot signal") from the eNB1, and received quality of a downlink reference signal from a radio base station eNB (for example, radio base station 2 (eNB2)) of a neighbouring cell, and to make a report in a case where a predetermined preset condition is satisfied. Based on the instruction from the eNB1, the UE measures received quality of the downlink reference signal, and makes a measurement report of a measurement result of the received quality of the downlink reference signal, to the eNB1. The eNB1 reports the measurement result reported from the UE to the OAM/SON server. In the example of FIG. 10, the eNB2 also similarly reports a measurement result from a UE under its control to the OAM/SON server. The OAM/SON server, on receipt of the reports of the measurement results from the eNB1 and eNB2, instructs the eNB1 and eNB2 to adjust radio parameters and the like in order to optimize radio coverage (adjustment for optimization). For example, in the eNB1 and eNB2, coverage optimization (adjustment of transmission power, antenna tilt angle, or the like) for its own cell is executed in accordance with an instruction, from the OAM/SON server, to adjust a radio parameter or the like in order to optimize radio coverage.

FIG. 11 cites a drawing in Non Patent Literature 4. The flowing describes an example of coverage optimization, using an example of WCDMA (Wideband Code Division Multiple Access) of FIG. 11. Here, received quality measured by the radio terminal (UE) is the ratio of desired signal power to interference signal power (Ec/Io). Eo/Io is measured at the radio terminal (UE) and a measurement result is reported to the radio base station. Statistical information of measurement results is acquired at a base station or OAM. In the base station or the OAM, for example, the following calculation is performed:

$R$=(ratio of terminals where $Ec/Io$ exceeds a threshold).

In a case where the calculated R is larger than a target, the base station or the OAM performs a unit step down of the transmission power of the radio base station. In a case where the calculated R is smaller than the target, the base station or the OAM performs a unit step up of the transmission power of the radio base station. It is to be noted that in LTE, use of RSRQ (reference signal received quality) may be considered instead of Ec/Io.

CITATION LIST

Non Patent Literature

[Non Patent Literature 1]
3GPP TS36.300 v9.4.0 Internet <http://www.3gpp.org/ftp/Spec s/html-info/36300.htm>)

[Non Patent Literature 2]
3GPP TR36.902 v9.2.0 Internet <http://www.3gpp.org/ftp/Specs/html-info/36902.htm>)

[Non Patent Literature 3]
NGMN Informative List of SON Use Cases Internet <http://www.ngmn.org/uploads/media/NGMN_Informative_List_of_SON_Use_Cases.pdf>)

[Non Patent Literature 4]
Janna Laiho, Achim Wacker, Tomas Novosad, "Radio Network Planning and Optimization for UMTS", John Wiley & Sons, pp. 422-423, 2002

[Non Patent Literature 5] R2-105238 (3GPP TS37.320 v1.0.0 (2010-08)) Internet <http://www.3gpp.org/ftp/tsg_ran/WG2_RL2/TSGR2_71/Docs/R2-1052 38.zip>)

[Non Patent Literature 6]
R2-103942 Internet <http://www.3gpp.org/ftp/tsg_ran/WG2_RL2/TSGR2_70bis/Docs/R2-10 3942.zip>

[Non Patent Literature 7]
3GPP TS36.304 v9.3.0 Internet <http://www.3gpp.org/ftp/Specs/html-info/36304.htm>)

[Non Patent Literature 8]
3GPP TR21.905 v10.2.0 Internet <http://www.3gpp.org/ftp/Specs/archive/21_series/21.905/21905-a20.zip>)

SUMMARY

An analysis of the related technology is given below.

Due to the introduction of a femto (cell) base station (called as "femto eNB" or home base station (HeNB)), in addition to inter-cell interference between macro cells, interference from the femto cell to a macro cell is generated.

When received quality of a serving cell is measured by a radio terminal (UE), Ec/Io (RSRQ) is derived as the ratio of total power including interference component(s) with respect to a desired signal, wherein in a case of Ec/Io, the total power is a power of signals from all cells that can be interference, and in a case of RSRQ, the total power including a desired signal)

For this reason, in a case where a radio terminal (UE) that resides in a macro cell of a macro radio base station (eNB) receives strong interference from a femto base station in its own macro cell or a neighboring macro cell, the received quality in the macro cell deteriorates more than before introduction of the femto base station, and the eNB unnecessarily shrinks the macro cell area.

For this reason, a blind (dead) zone (also called as a "coverage hole") may be generated in the macro cell. It is to be noted that the blind zone is an area in which a radio terminal cannot receive basic service from a radio base station.

FIG. 12 is a diagram for illustrating this problem. The radio terminal (UE) resides in a macro cell 1 (Cell1) of the radio base station 1 (eNB1), and neighboring cells are cells Cell2 and Cell3 of radio base stations 2 and 3, and furthermore are in the vicinity of a femto cell in Cell2.

In a case where the radio terminal (UE) receives strong interference from a femto base station (HeNB) in the neighboring macro cell Cell2, a report that received quality deteriorates is made to the first radio base station 1 (eNB1) (1: Meas report).

The radio base station 1 (eNB1) reports the report from the radio terminal (UE) to the OAM/SON server (2: Report).

The OAM/SON server causes the radio base station 1 (eNB1) to shrink coverage of the cell Cell (3: Adjustment).

That is, it is assumed that a plurality of radio terminals (UE) residing in the macro cell (Cell1) of the radio base station 1 (eNB1) receive strong interference from the femto base station (HeNB), and the number of reports indicating that received quality in a macro cell deteriorates due to other cell interference, increases more than before the introduction of the femto base station. In this case, the radio base station 1 (eNB1), performs the shrinking of the coverage of the macro cell Cell1 in an unnecessary manner. As a result, a coverage hole (blind zone) may occur.

Therefore, it is an object of the present invention to provide a system, method, and apparatus that enable identification of interference cause and appropriate optimization processing for each cause of interference.

The following presents a simplified summary of one or more modes and corresponding disclosure thereof in order to provide basic understanding of such modes, and is not intended to delineate the scope of any or all modes. The purpose of the simplified summary is to present some concepts of one or more modes or embodiments presented later.

According to one of related aspects of the present invention, there is provided a radio communication system including: a first radio station; a second radio station of a similar type to the first radio station and/or a third radio station of a different type from the first radio station; a radio terminal served by the first radio station; and an operation administration and maintenance server that exchanges configuration information with at least one of the first to third radio stations, wherein the first radio station instructs the radio terminal to measure received quality of a downlink signal from at least one of the second or the third radio station, the radio terminal includes a measurement unit that performs measurement in accordance with the instruction, and at least one of the first radio station and the operation administration and maintenance server comprises means to receive a report of a measurement result by the radio terminal, to identify the radio station type from the report, to perform at least one of determining whether or not a change is to be made to a radio network configuration of at least one radio station of the first to third radio stations, and executing at least one change of the radio network configuration.

According to another aspect of the present invention, there is provided a radio communication method of: instructing a radio terminal from a first radio station, to measure received quality of a downlink signal from at least one of a second radio station of a similar type to the first radio station, and/or a third radio station of a different type from the first radio station, performing measurement in accordance with the instruction, by the radio terminal, receiving, by at least one of the first radio station and an operation administration and maintenance server, a report of a measurement result by the radio terminal, identifying the radio station type from the report, and performing at least one of determining whether or not to change a radio network configuration of at least one radio station of the first to third radio stations, and changing the radio network configuration.

According to another aspect of the present invention, there is provided a radio station connected by radio to a radio terminal, the radio station being provided with means that: instructs the radio terminal to measure received quality of a downlink signal from at least one radio station that is at least one of a second radio station of a similar type to the radio station and/or a third radio station of a different type from the radio station, receives a report of a measurement result by the radio terminal, identifies a type of the radio station from the report, and performs at least one of determining whether or not to change a radio network configuration, and changing the radio network configuration.

According to another aspect of the present invention, there is provided an operation administration and maintenance server apparatus that includes means that receives a report of a measurement result by a radio terminal via a first radio station that instructs the radio terminal to measure interference received from at least one radio station that is at least one of a second radio station of a similar type to the first radio station and a third radio station of a different type from the first radio station, identifies a type of the radio station from the report, and performs at least one of determining whether or not to change a radio network configuration of at least one radio station of the first radio station through third radio station, and changing the radio network configuration.

According to the present invention, it is possible to perform appropriate optimization processing for each cause of interference. Also, according to the present invention, it is possible to suppress the occurrence of blind zones after the introduction of a femto base station, and furthermore, to implement optimization of macro-macro or macro-femto interference.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 8 is a diagram illustrating sequence operations of a fourth exemplary embodiment of the present invention.

FIGS. 9A, 9B and 9C is a diagram illustrating another example of an algorithm for coverage optimization and interference optimization in the present invention.

PREFERRED MODES

Figure 1:
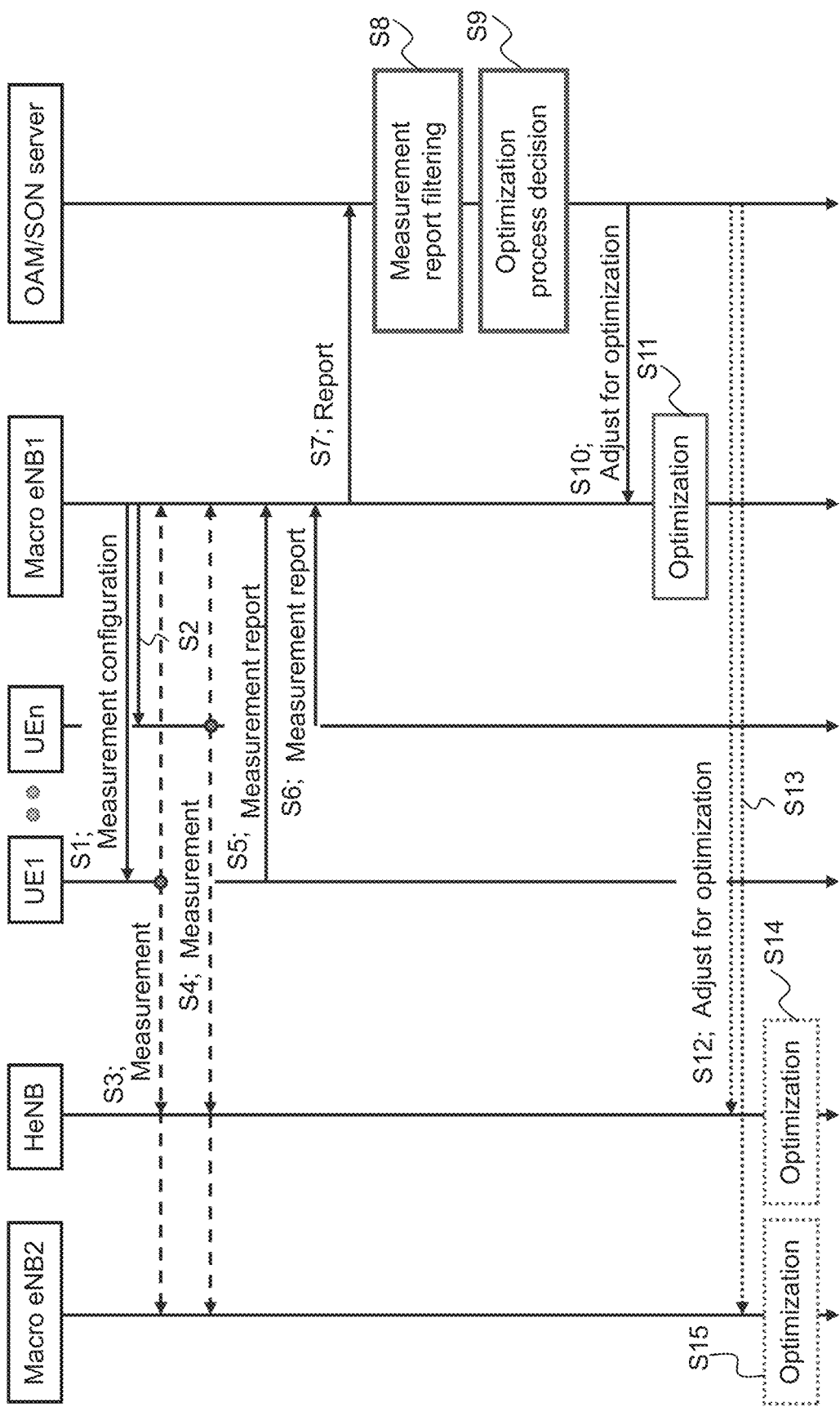
FIG. 1 is a diagram illustrating sequence operations of a first exemplary embodiment of the present invention.

The following describes exemplary embodiments of the present invention assuming a cellular system (UMTS: Universal Mobile Terrestrial System or LTE: Long Term Evolution) as specified by the 3GPP (3rd Generation Partnership Project). In one of modes of the present invention, at least one of a radio station (radio base station: eNodeB (eNB), or base station control station: RNC (Radio Network Controller) and operation administration and maintenance (for example, OAM) server, or SON ((Self Organizing Network) server) identifies (a neighboring cell that is) a cause of interference to a serving cell, from information of a measurement report from a radio terminal (UE: User Equipment), and at least one of the radio station and the operation administration and maintenance server executes optimization processing in accordance with the interference cause.

As targets for optimization processing to be executed by at least one of the radio station and the operation administration and maintenance server, there is radio network configuration, for example, cited as follows:

(I) radio parameter setting such as,
   transmission power and antenna tilt angle,
   system bandwidth,
   (carrier) frequency to be used,
   cell selection parameters,
   handover parameters, or the like,
(II) network operation setting such as
cell type (size or attributes: open, closed, or hybrid) or the like.

It is to be noted that a representative example of a closed cell may be a CSG (Closed Subscriber Group) cell of a femto cell (also called as a "home cell").

On the other hand, as causes of interference, the radio station and/or the operation administration and maintenance server identifies differences such as:
   whether interference is from a macro base station/cell,
   whether interference is from a micro base station/cell,
   whether interference is from a pico base station/cell,
   whether interference is from a relay base station/cell,
   whether interference is from an open (all radio terminals can connect to) femto base station/cell,
   whether interference is from a closed (only restricted members can connect to) femto base station/cell,
   whether interference is from a hybrid (having both open and closed elements) femto base station/cell,
   whether interference is from (the same type or different type of) base station/cell in a neighboring (white or black) cell list,
   whether interference is from (the same type or different type of) base station/cell outside of a neighboring (white or black) cell list.

For example, assuming a situation where a macro cell and a femto cell are interfering with each other, by identifying interference from a macro cell radio base station (radio station) and interference from a femto base station, and by performing appropriate optimization processing for each cause of interference, even after the introduction of the femto base station, it is possible to avoid carrying out an unnecessary coverage increase or decrease and/or an unnecessary interference avoidance operation, and to suppress the occurrence of a blind zone.

That is, according to the present invention, at least one of a radio station and an operation administration and maintenance server, interference from the femto base station is distinguished from interference among macro cell base stations, and determination and execution with regard to at least one method of coverage optimization by a coverage increase or decrease, and of interference optimization by interference avoidance to reduce interference. In this regard, there are several options as indicated below.

Option 1 (Mode 1):
In a case where only interference from a femto base station is large, macro cell coverage optimization or interference optimization between macro cells is not performed, or macro cell-femto cell interference optimization is performed with priority over inter-macro cell coverage optimization.

Option 1-1 (Mode 2):
In a case where interference is calculated for each type of cell, based on received power (intensity) of respective neighboring cells, the interference from a macro cell base station is less than a predetermined first preset value (preset level), and the interference from a femto base station is greater than or equal to a predetermined second preset value (preset level), an macro cell coverage increase or decrease and interference avoidance between macro cells is not performed, or, macro cell-femto cell interference optimization is performed with priority (however, this interference optimization may need not be performed). It is to be noted that the first and second preset values (preset levels) may be the same, or may have values different from one another (for example, an offset is configured between the first and second preset values).

Option 1-2 (Mode 3):

In a case where reports of measurement results, stating that an interference or a received quality of an interference signal from a macro cell base station is greater than or equal to a predetermined third preset value (preset level), are less than a predetermined first preset number (preset threshold), and reports of measurement results, stating that an interference or a received quality of an interference signal from a femto cell base station is greater than or equal to a predetermined fourth preset value (preset level), are greater than or equal to a predetermined second preset number (preset threshold), an inter-macro cell coverage increase or decrease and interference avoidance is not performed, or macro cell-femto cell interference optimization is performed with priority (however, this interference optimization does not have to be performed). It is to be noted that the third and fourth preset values (preset levels), and the first and second preset numbers (preset thresholds) may respectively be the same, or may have values different from one another (for example, an offset may be set between the third and fourth preset values, and the first and second preset numbers).

Option 2 (Another Mode):

In a case where both interference from a macro cell base station and interference from a femto cell base station are large:

coverage increase or decrease of macro cell base station and interference avoidance is performed with priority.

interference avoidance between macro cell base station and femto base station is performed with priority.

Option 3 (Another Mode):

The optimization is applied to combinations of other cell modes in which interfering radio base stations/cells are of different types, such as between macro cell and pico cell, micro cell and femto cell, pico cell and femto cell, or the like is applied. Furthermore, the optimization can be applied to a case of a relay base station (relay node: RN). For example, in a case where the relay base station/cell types are macro, micro, and pico, handling is similar to macro base station/cell, micro base station/cell, and pico base station/cell, respectively.

On the other hand, the optimization may be performed by discriminating interference from a relay base station/cell. For example, in a case where interference from the relay base station/cell is strong, not only coverage optimization or interference avoidance may be performed (or the coverage optimization or interference avoidance may be not performed), but optimization may be performed for backhaul radio resource configuration, as used between a relay base station and a parent base station (DeNB: Donor eNode B). In LTE, communication between a relay base station and a parent base station, and communication between a relay base station and a radio terminal under the relay base station may be performed by time division, and setting of time (period) assigned to respective communications may be performed in the configuration of the backhaul radio resource.

Option 4 (Another Mode):

Distinguishing of the type, up to the type of femto base station/cell (open, closed, hybrid), is performed and optimization processing is executed. For example, with respect to a problem of interference between a macro (or micro, pico) cell and a femto cell, in a case where the femto cell is an "open cell", the femto base station/cell is treated the same as a micro base station/cell or a pico base station/cell, and the coverage optimization or interference avoidance as described above is executed.

On the other hand, in a case where the femto cell is a "closed cell" (also called a "CSG cell" (Closed Subscriber Group cell)), and it is judged that interference from the closed femto cell is strong, the coverage optimization or interference avoidance as described above may be executed, or the cell type may be changed from closed to open or hybrid. In a case where the femto cell is "hybrid", based on an attribute (member or non-member) with respect to the radio terminal that makes a measurement report, a cause of interference is identified, and coverage optimization or interference avoidance optimization processing is executed.

Option 5 (Another Mode):

An identification is made as to whether or not a cell is included in a Neighbor Cell List (NCL), and interference optimization processing is executed. At this time, a method may be used in which consideration is given as to whether the neighboring cell list is a White List (including a normal neighboring cell list), which is a list of cells that are to be connection targets, or a Black List, which is a list of cells to be excluded from a connection target. For example, in a case where a cell causing interference is included in the white list, coverage optimization and interference avoidance is performed according to the present invention as described above, or coverage optimization and interference avoidance is performed according to the related technology.

In a case where the cell causing interference is a cell not included in the white list, consideration is not given to a measurement report from a radio terminal concerning the cell in question (the cell causing interference, not included in the white list), but coverage optimization or interference avoidance is performed, and for the cell in question, a decision is made as to whether or not the cell should be included in the neighboring cell list. For example, an ANR function (Automatic Neighbor Relation Function) for optimizing a neighboring list as investigated in 3GPP may also be used. The ANR function, for example, has a function for making a radio terminal to report as to the presence of a cell in the vicinity thereof that is not recognized by a radio base station, and in this way it is possible to perform automatic optimization of a neighboring cell list.

On the other hand, in a case where a cell causing interference is a cell in the black list, besides coverage optimization or interference avoidance, the cell in question (cell causing interference, included in the black list) may also be excluded from the black list. Here, a radio terminal basically does not perform measurement of received quality of a downlink signal of a black list cell. However, in a case where, for example, a coverage problem such as a coverage hole or the like is detected (or in a stage before detecting this), measurement may be performed of received quality of a downlink signal of a black list cell. In this way, the above described processing can be executed.

It is to be noted that with regard to optimization technology in the present invention, there is no limitation to the above described coverage optimization or interference avoidance (interference optimization), and application is also possible to determination of execution of other SON technologies, such as Mobility Optimization (also referred to as Mobility Robustness Optimization) of a radio terminal, Load Balancing (or Mobility Load Balancing) of a radio terminal, radio (cell) Capacity Optimization.

First Exemplary Embodiment

FIG. 1 is a diagram illustrating sequence operations of a first exemplary embodiment of the present invention. As shown in FIG. 1, radio terminals UE1 to UEn, macro base stations eNB1 and eNB2, a femto base station HeNB (also called as femto eNB: "FeNB"), and an OAM/SON server are provided.

The macro base station eNB1 transmits a message (Measurement configuration) instructing measurement with respect to each subordinate UE1 to UEn (S1, S2). Measurement items (received quality, measurement area, measurement timing, and the like), cells that are targets of measurement, and measurement mode (periodically, or when a specific event occurs (event trigger)), contents of measurement report, and the like is specified in the message (Measurement configuration).

UE1 to UEn that respectively receive the message (Measurement configuration) instructing measurement from the base station eNB1, perform measurement in accordance with the instruction content (S3, S4: Measurement) and report a measurement result to the eNB1 (S5, S6: Measurement report).

The eNB1 receives the report of the measurement result from UE1 to UEn, and reports to the OAM/SON server (S7: Report).

In the OAM/SON server, the measurement report is filtered (S8: Measurement report filtering), and optimization processing of coverage and/or interference is decided (S9: Optimization process decision).

The OAM/SON server instructs the eNB1 to adjust radio parameters for coverage optimization or interference avoidance (optimization) (S10: Adjustment for optimization).

The eNB1 receives the instruction from the OAM/SON server and performs optimization processing, such as coverage optimization, interference optimization, and the like (S11: Optimization).

The OAM/SON server, if necessary, instructs the HeNB and eNB2 to adjust radio parameters for coverage optimization or interference avoidance (optimization) (S12, S13: Adjust for optimization).

The HeNB and eNB2 each receive an instruction from the OAM/SON server, and perform optimization of a radio parameter (S14, S15: Optimization).

It is to be noted that an adjustment performed by the eNB1 or the like is a radio network configuration, and this is not limited to radio parameters, but also may include network operation setting, as described above.

<System Configuration>

Figure 2:
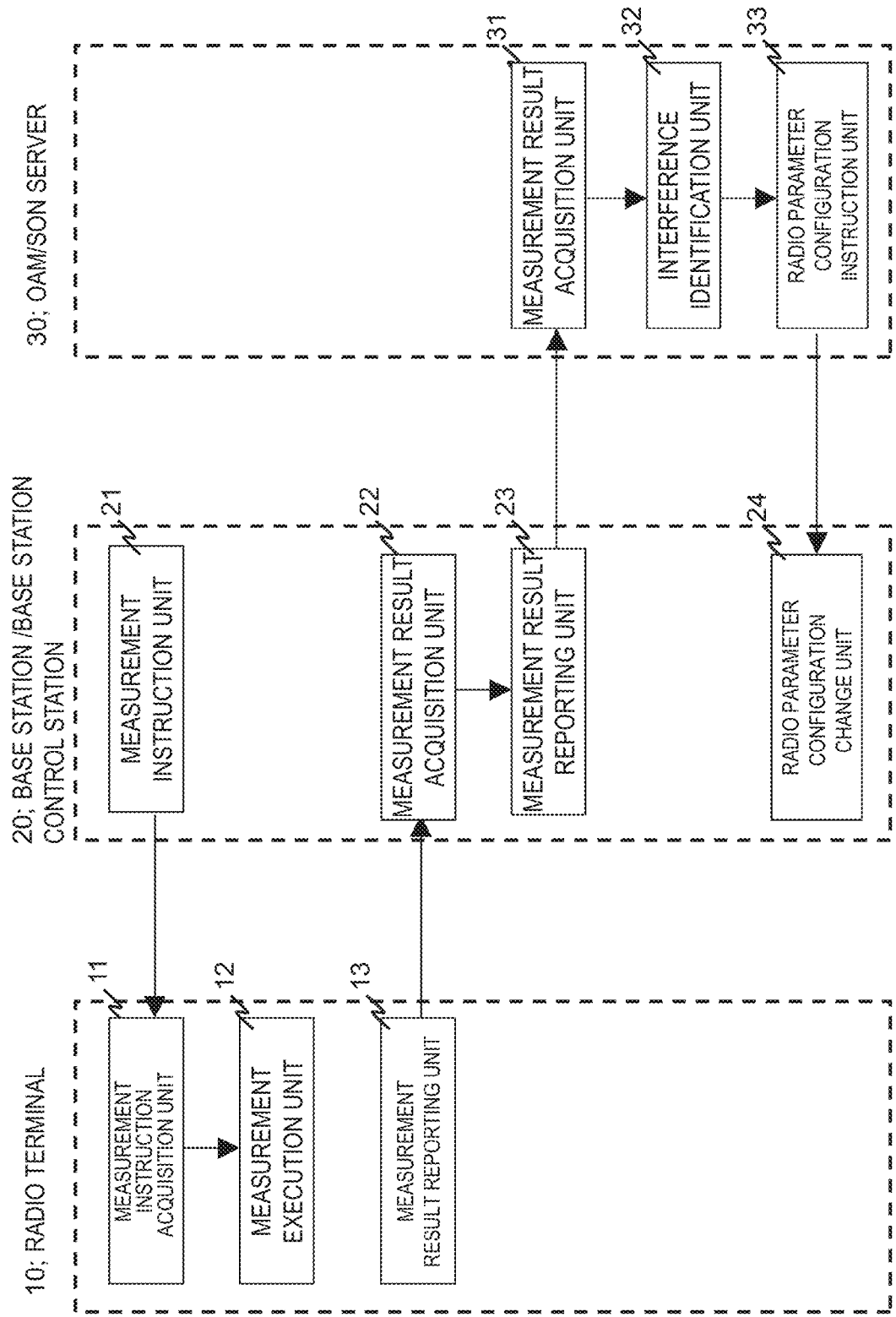
FIG. 2 is a diagram illustrating a configuration of the first exemplary embodiment of the present invention.

FIG. 2 is a diagram illustrating a block configuration of main parts of a system arrangement related to the present invention, with regard to a radio terminal (UE), a base station/base station control station, and OAM/SON server, in the first exemplary embodiment of the present invention. It is to be noted that the configuration of FIG. 2 can also be applied to respective exemplary embodiments as in second and subsequent exemplary embodiments to be described later. Referring to FIG. 2, a radio terminal 10 includes a measurement instruction acquisition unit 11 that acquires a measurement instruction message transmitted over a radio from a base station 20, a measurement execution unit 12 that receives a measurement instruction from the measurement instruction acquisition unit 11 and measures the quality of a cell, and a measurement result reporting unit 13 that reports a measurement result over a radio to the base station 20. The radio terminal 10 includes a radio unit and a base band unit that are not shown in the drawing.

Also provided are a cell detection unit (not shown in the drawing) that, besides initial cell search when a power supply is turned ON, performs search for an appropriate cell, such as a cell with good quality for a radio terminal, based on a synchronization signal or the like, during communication, while waiting, at a time of intermittent reception, and the like; and a control unit (not shown in the drawing) which performs link control such as connection establishment, connection maintenance and release, for radio links, and in addition, management of idle state/active state, and control of respective parts.

The base station 20 includes a measurement instruction unit 21 that gives a measurement instruction to the radio terminal 10, a measurement result acquisition unit 22 that receives the measurement instruction from the measurement instruction unit 21 and acquires a measurement result from the radio terminal 10, a measurement result report unit 23 that reports the measurement result to the OAM/SON server 30, and a radio parameter configuration change unit 24 for changing configuration (tilt angle of a transmission antenna, transmission power) of the base station 20.

The OAM/SON server 30 (operation administration and maintenance server) includes a measurement result acquisition unit 31 that acquires a measurement result from the measurement result report unit 23 of the base station 20, an interference identification unit 32 that identifies an interference based on the measurement result, and a radio parameter configuration instruction unit 33. The radio parameter configuration instruction unit 33 gives a radio parameter configuration instruction to the base station 20.

Coverage optimization and interference optimization (interference avoidance or mitigation) can be performed by an increase or decrease (expanding or shrinking) of cell coverage, or avoidance of interference between cells, or by both an increase or decrease of cell coverage and avoidance of interference between cells.

In the radio base station, the coverage increase or decrease is carried out by:

increase or decrease of transmission power of a downlink reference signal (pilot signal) and the like, increase or decrease of antenna tilt angle.

Furthermore, a pseudo increase or decrease of coverage is allowed which adjusts an area of influence of a cell by control of radio parameters (cell individual offset value, event-specific offset value, priority, or the like) related to cell selection and handover.

The interference avoidance is carried out for a radio base station by:

usage restriction of radio resources, transmission power control.

Here, as a usage restriction of a radio resource, for example, usage may be made of a method such as dividing time and/or frequency resources among a plurality of radio base stations that are interfering with one another.

As transmission power control, for example, usage may be made of determining (limiting) transmission power for a data signal, based on amount of interference among the radio base stations.

For each thereof, usage may be carried out by a certain radio base station independently, or by a plurality of radio base stations in collaboration (simultaneously).

A decision to execute coverage optimization or interference optimization may be made by a radio base station, or may be made by an operation administration and maintenance server (OAM/SON server).

<Algorithm for Coverage Optimization and Interference Optimization>

As an example of an algorithm for coverage optimization and interference optimization, a description is given below of a case focusing on a certain serving cell of a certain macro cell base station.

Step 1:

Content of measurement reports from a radio terminal is aggregated by performing classification per type of neighboring cell that is a target for measurement (whether macro cell, femto cell, etc.) (measurement report filtering). A determination is made as to whether a cell is a macro cell, a femto cell, or the like, by cell ID (for example, physical cell ID (PCI) or primary scramble code (PSC) for distinguishing respective cells) of measurement target cells included in the report.

Step 2:

With regard to reports, per type of a neighboring cell (macro cell, femto cell, or the like), a decision is made as to whether or not the number of reports, each of which states that neighboring cell channel quality (received quality of a downlink signal) (Reference Signal Received Power: RSRP, Reference Signal Received Quality: RSRQ, and the like) is greater than or equal to a predetermined preset value (preset level), is greater than or equal to a predetermined preset number (preset threshold) (or a preset proportion of the total), and, if greater than or equal to the preset number, optimization processing of Step 3 is performed, and if less than the preset number, processing returns to Step 1.

Step 3:

In a case where the type of neighboring cell is a macro cell, coverage optimization (coverage increase or decrease, radio parameter change related to cell selection or handover) is executed, and in a case where the type of neighboring cell is a femto cell, macro-femto interference optimization (interference avoidance) is executed.

It is to be noted that with regard to determining which cell is a target for coverage and/or interference optimization, a decision is made as to whether or not a cell satisfying the conditions of Step 2 is biased towards a specific neighboring cell pair (combination of a serving cell and a neighboring cell).

As a result of the abovementioned determination, in a case where there is no bias, the coverage and/or interference optimization is executed by only the serving cell (cell to which a UE is assigned).

As a result of the abovementioned determination, in a case where there is a bias to a specific neighboring cell pair, the coverage and/or interference optimization is executed by each of the specific neighboring cell pair.

Figure 3:
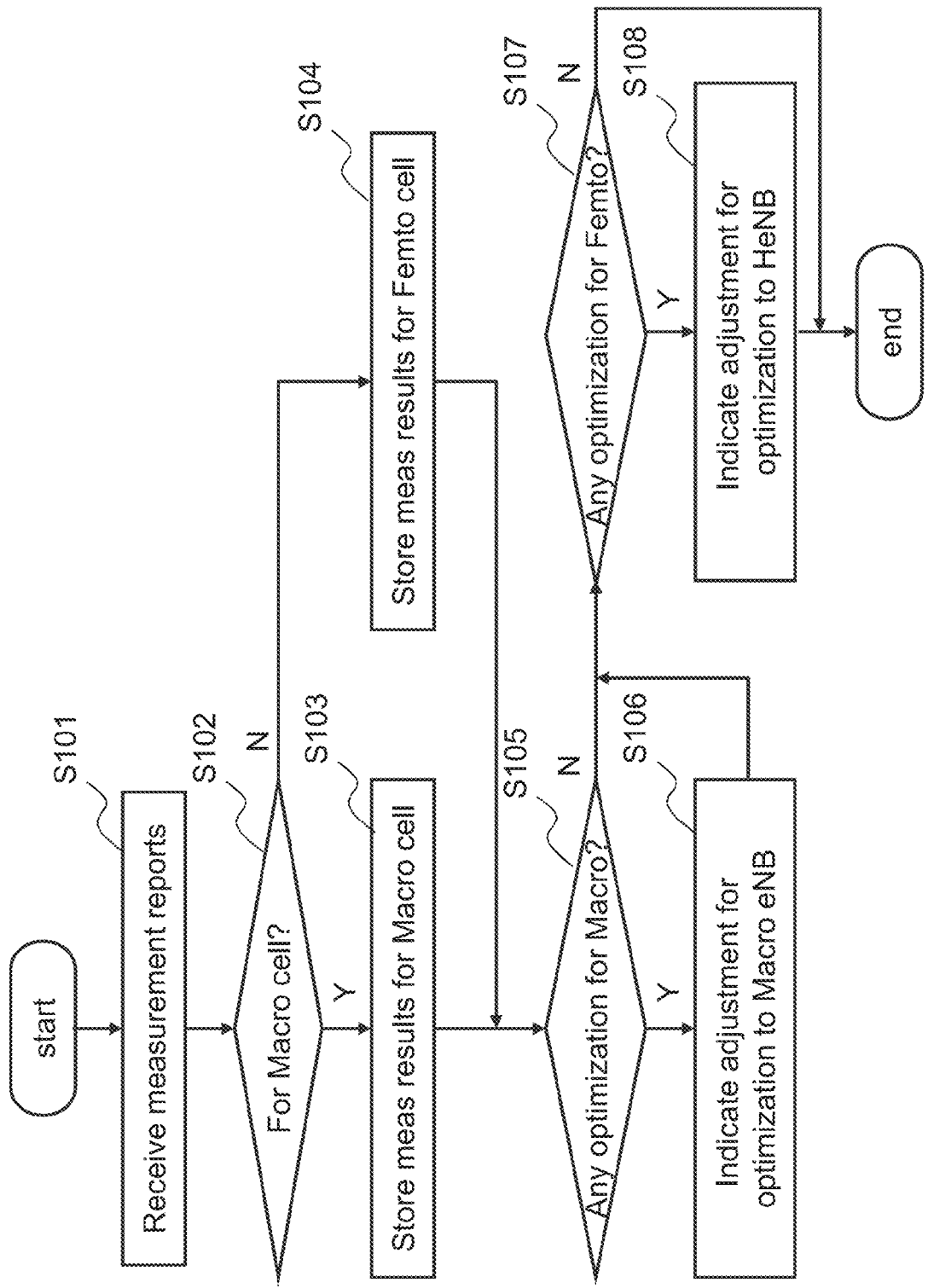
FIG. 3 is a flowchart illustrating operation of an OAM/SON server of the first exemplary embodiment of the present invention.

FIG. 3 is a flowchart describing operation of the OAM/SON server of the first exemplary embodiment of the present invention. It is to be noted that processing of FIG. 3 is performed by an OAM server or a SON server.

The OAM/SON server receives measurement reports (Step S101: Receive measurement reports).

The OAM/SON server determines whether a measurement target included in a report is a macro cell or a femto cell (Step S102), and makes a division into macro cells and femto cells to record a measurement result (Steps S103, S104: Store measurement results for macro (femto) cell). That is, the OAM/SON server aggregates contents of measurement reports transmitted via a radio base station from a radio terminal, per type of neighboring cell that is a target for measurement (whether macro cell or femto cell).

On determining that optimization of a macro cell is necessary (Y in S105: Any optimization for macro), the OAM/SON server instructs a macro base station eNB to adjust for optimization (Step S106: Indicate adjustment for optimization to macro eNB).

On the other hand, on determining that optimization of a femto cell is necessary (Y in S107: Any optimization for femto), the OAM/SON server instructs a femto base station HeNB to adjust for optimization (Step S108: Indicate adjustment for optimization to HeNB).

First Exemplary Embodiment

Modified Example 1

Figure 4:
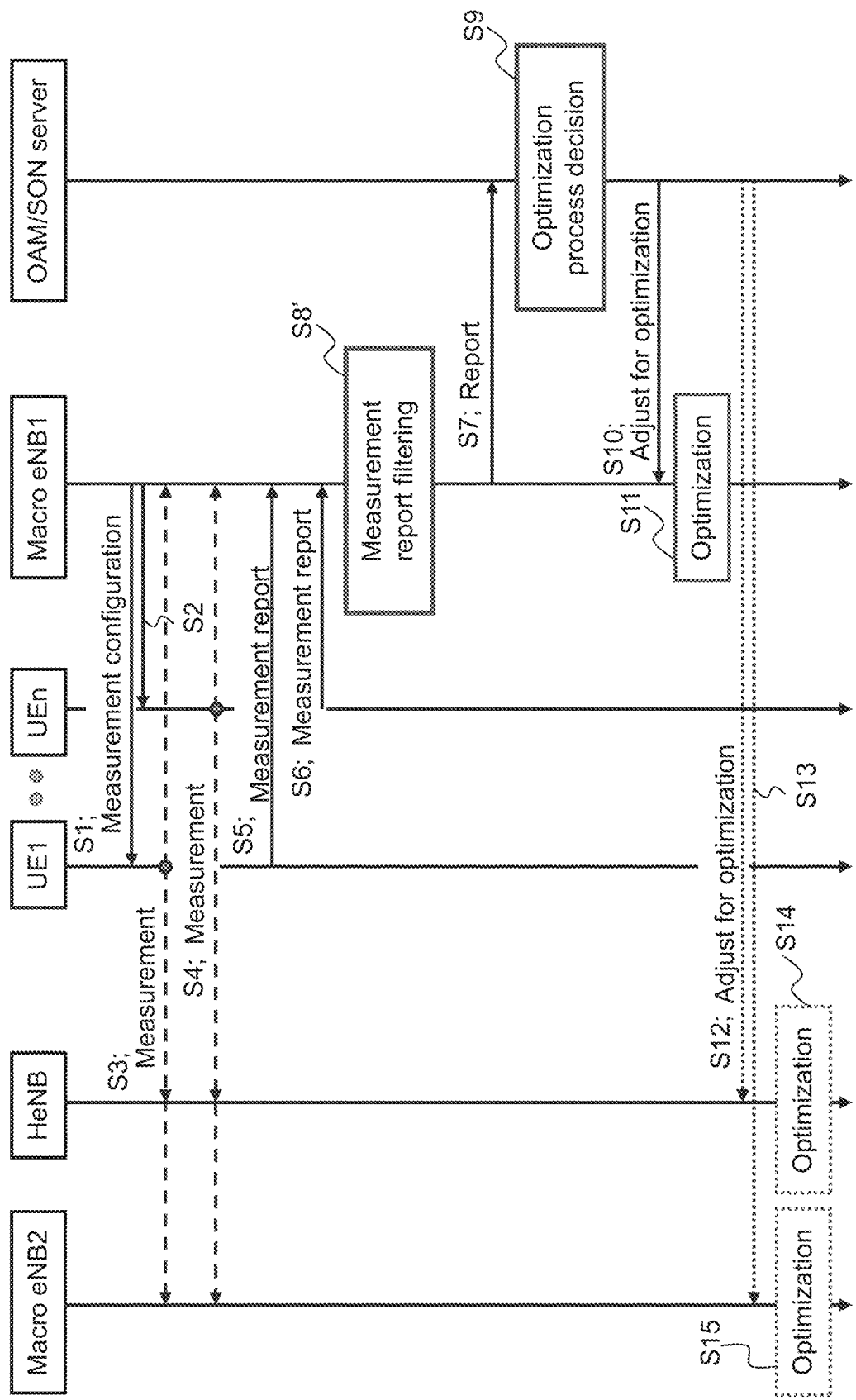
FIG. 4 is a diagram illustrating sequence operations of a first modified example of the first exemplary embodiment of the present invention.

FIG. 4 is a diagram illustrating a modified example 1 of the first exemplary embodiment of the present invention. It is to be noted that in FIG. 4 a sequence from S1 to S6 is the same as in FIG. 1, and a description thereof is omitted.

On receiving measurement reports from UE1 to UEn, the eNB1 performs filtering of the measurement reports (whether a macro cell, a femto cell, or the like), and performs classification into macro cell or femto cell report (S8': measurement report filtering).

The eNB1 sends the reports that has been classified to the OAM/SON server (S7: Report).

The OAM/SON server decides coverage and/or interference optimization processing (S9: Optimization process decision).

The OAM/SON server instructs the eNB1 to adjust radio parameters for coverage optimization and/or interference optimization (S10: Adjust for optimization).

The eNB1 receives an instruction from the OAM/SON server, and performs optimization of a radio parameter (S11: Optimization).

The OAM/SON server, if necessary, instructs the HeNB and the eNB2 to adjust radio parameters for coverage and/or interference optimization, respectively (S12, S13: Adjust for optimization). The HeNB and the eNB2 respectively receive an instruction from the OAM/SON server and perform optimization of a radio parameter (S14, S15: Optimization). It is to be noted that adjustment for optimization is not limited to radio parameters, and may include any radio network configuration.

First Exemplary Embodiment

Modified Example 2

Figure 5:
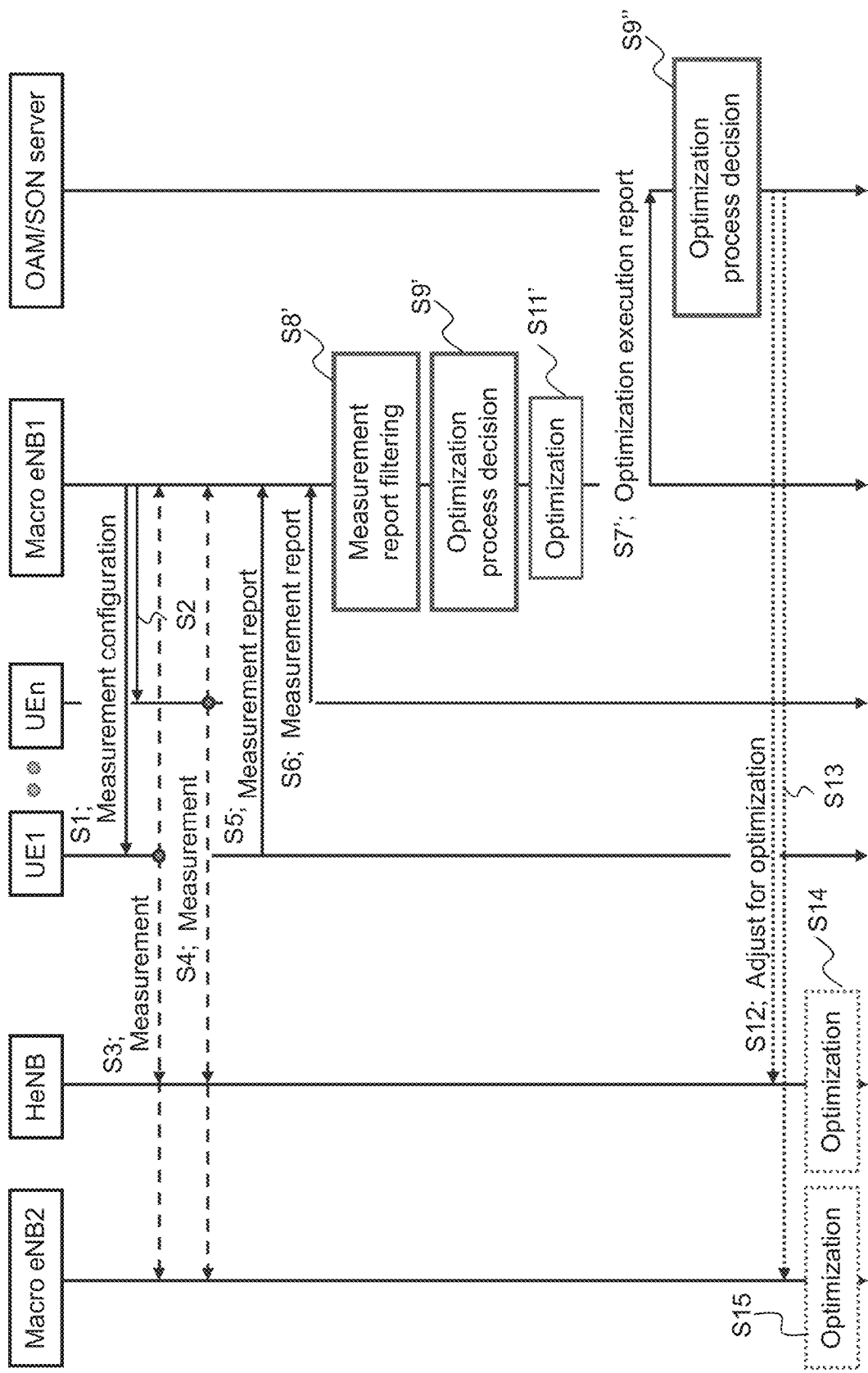
FIG. 5 is a diagram illustrating sequence operations of a second modified example of a second exemplary embodiment of the present invention.

FIG. 5 is a diagram illustrating a modified example 2 of the first exemplary embodiment of the present invention. In FIG. 5, a sequence from S1 to S6 is the same as in FIG. 1, and a description thereof is omitted.

On receiving measurement reports from UE1 to UEn, the eNB1 performs filtering of the measurement reports (whether a macro cell, a femto cell, or the like) to classify the measurement reports into macro cell or femto cell (S8': measurement report filtering), decides coverage and/or interference optimization processing (S9': Optimization process decision), executes optimization of its own cell (S11': Optimization), and sends an optimization execution report to the OAM/SON server (S7': Optimization execution report).

The OAM/SON server, on receiving this report, decides optimization processing for neighboring cells (S9''). In a case where optimization is necessary, the OAM/SON server instructs the HeNB and eNB2 to adjust radio parameters for coverage and/or interference optimization, respectively (S12, S13: Adjust for optimization). The HeNB and eNB2, on receiving an instruction from the OAM/SON server, perform optimization of a radio parameter (S14, S15: Optimization). It is to be noted that targets of adjustment for optimization are not limited to radio parameters, and may include any radio parameter and radio network configuration.

Second Exemplary Embodiment

Figure 6:
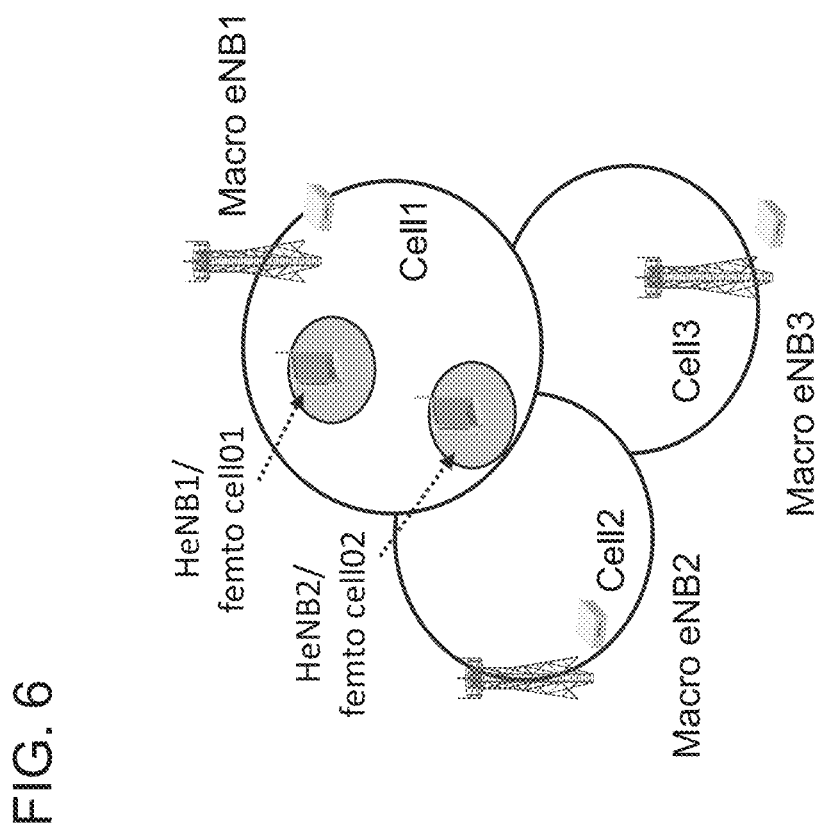
FIG. 6 is a diagram illustrating the second exemplary embodiment of the present invention.

The following describes a second exemplary embodiment of the present invention. FIG. 6 is a diagram illustrating the second exemplary embodiment of the present invention. In the present exemplary embodiment, interference is calculated for each cell type, based on received power (RSRP) of each neighboring cell. In a case where interference from a femto base station is greater than or equal to a predetermined second preset value (level) but the interference from a macro cell base station is less than a predetermined first preset value (level), coverage optimization (radio parameter change such as cell selection or handover related parameters, or coverage increase or decrease) and interference optimization (decrease of interference and avoidance of interference) among macro cells is not performed. The first and second preset values may be the same, or an offset may be set between the first and second preset values. As an example, an optimization procedure seen from the viewpoint of a macro cell is shown below.

First, received power of a downlink reference signal (pilot signal) RSRP of a macro cell of a serving cell of a radio terminal that performs a measurement report, and received power of a downlink reference signal (pilot signal) RSRP of each neighboring cell are aggregated. The aggregate result may be averaged for each predetermined preset period, or may be reset each time optimization processing is performed.

Next, interference (referred to as ISSI: Interference Signal Strength Indicator or interference power) is calculated for each neighboring cell. It is to be noted that the interference may be averaged for each predetermined preset period. A well known method may be used for calculation of RSRP and ISSI for downlink reference signals (common pilot signals) in LTE.

In a case where interference from a neighboring cell that is a macro cell is greater than or equal to a predetermined first preset value, inter-macro cell coverage optimization (coverage increase or decrease, cell selection and handover related radio parameter change), interference optimization (decrease or avoidance of interference) is performed.

In a case where the interference from a neighboring cell that is a femto cell is greater than or equal to the predetermined second preset value, but where the interference from a neighboring cell that is a macro cell is less than the predetermined first preset value, optimization such as the inter-macro cell coverage optimization, interference optimization and the like is not performed.

More specifically, for example, interference (ISSI or the like) is calculated for each cell type, based on received power (RSRP) from respective neighboring cells Cell2, Cell3, and femto cells Cell01, Cell02, with respect to a UE residing in a macro cell Cell1. In a case where, even if the interference ISSI from a femto base station HeNB1 or HeNB2 of the femto cells Cell01 or Cell02 is greater than or equal to a predetermined preset value, the interference (ISSI) from base stations eNB2 and eNB3 of the macro cells Cell2 and Cell3 is less than the predetermined preset value, inter-macro cell coverage increase or decrease and interference avoidance is not performed. In a case where the interference (ISSI) from the base stations eNB2 and eNB3 of the macro cells Cell2 and Cell3 is greater than or equal to the predetermined preset value, inter-macro cell coverage increase or decrease and interference avoidance is performed.

Third Exemplary Embodiment

The following describes a third exemplary embodiment of the present invention. In the present exemplary embodiment, in a case where reports, in which received quality of an interference signal from a femto base station is greater than or equal to a predetermined preset value, are greater than or equal to a predetermined preset number, and reports, in which received quality of an interference signal from a macro base station is greater than or equal to a predetermined preset value, are less than the preset number, inter-macro cell coverage increase or decrease and interference avoidance is not performed. It is to be noted that a report from the same radio terminal within a preset period is treated as one report. A report that received quality is less than a predetermined preset value due to interference from a femto base station may be used instead of a report that received quality of an interference signal from the femto base station is greater than or equal to a preset value, and a report that received quality is less than a predetermined preset value due to interference from a macro base station may be used instead of a report that received quality of an interference signal from the macro base station is greater than or equal to a preset value.

Figures 7A, 7B:
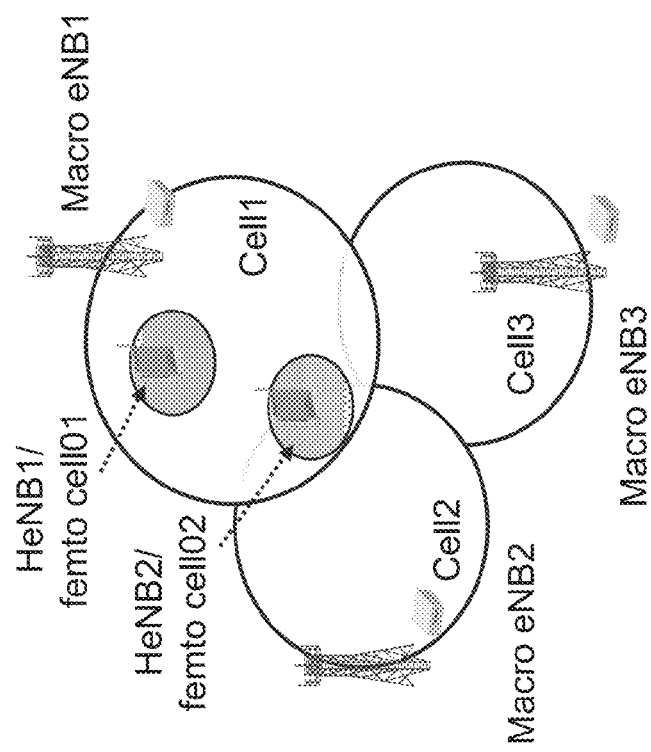
FIGS. 7A and 7B are diagrams illustrating a third exemplary embodiment of the present invention.
Figure 10:
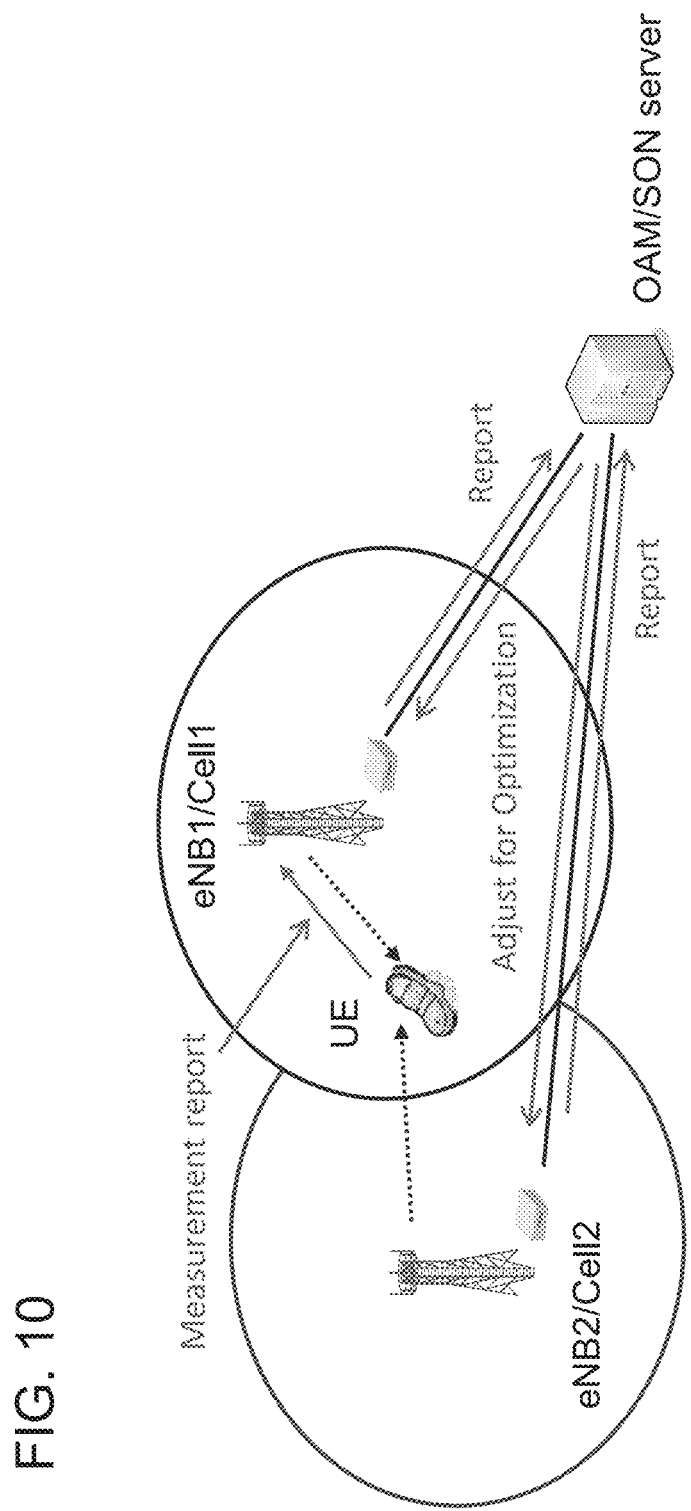
FIG. 10 is a diagram schematically illustrating coverage optimization between macro cells in related technology.
Figure 11:
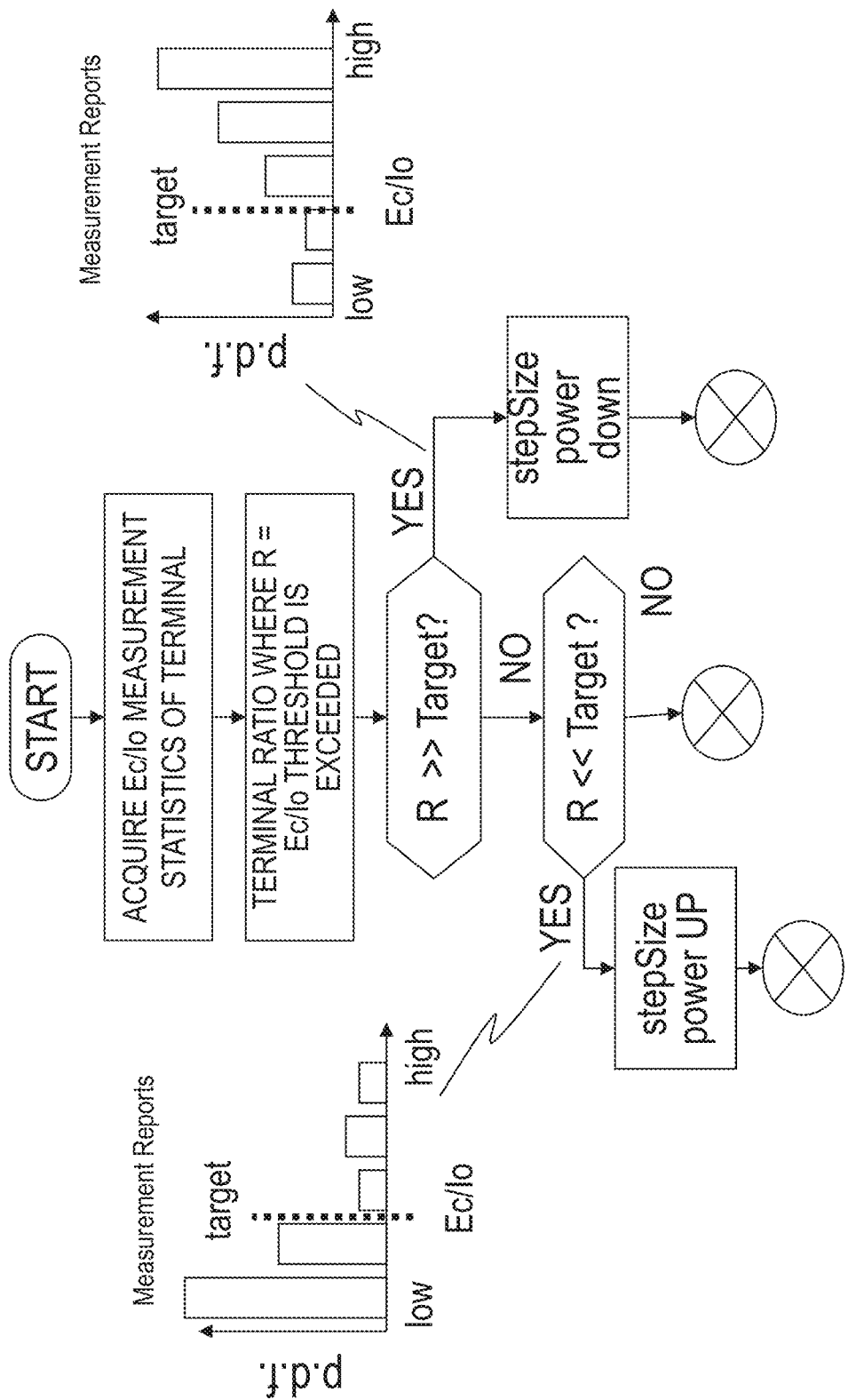
FIG. 11 is a diagram illustrating a procedure in coverage optimization between macro cells in related technology.
Figure 12:
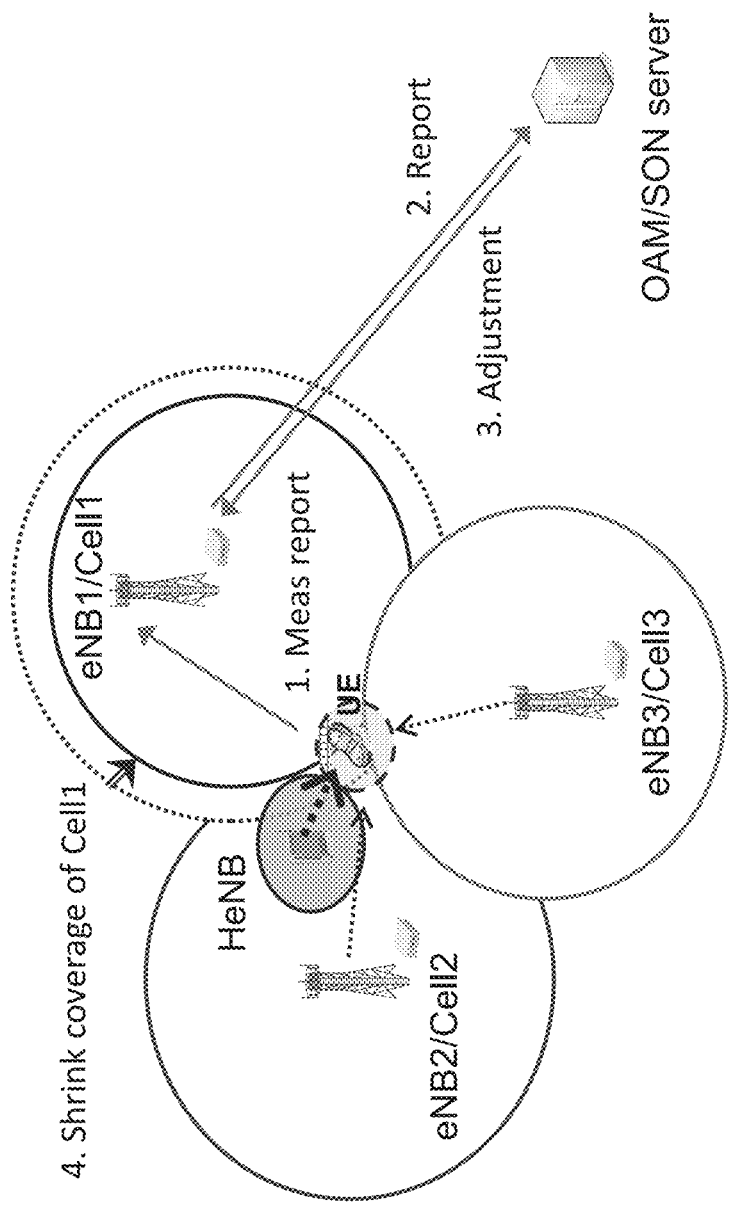
FIG. 12 is a diagram schematically illustrating a problem of coverage and interference optimization between macro cells in related technology.

In the present exemplary embodiment, a counter is arranged for each pair of a source cell (a cell in which a UE that performs measurement is present) and a neighboring cell. FIGS. 7A and 7B are diagrams illustrating the third exemplary embodiment of the present invention. FIG. 7A is a diagram schematically illustrating an example of a management table in the present exemplary embodiment, and corresponds to a cell configuration of FIG. 7B. It is to be noted that in FIG. 7A, source cells are macro cells only. In a case where a source cell is a macro cell Cell1, counters of macro cells Cell2 and Cell3, and femto cells Cell01 and Cell02, as neighboring cells thereof, are arranged. In a case where a source cell is the macro cell Cell2, counters of neighboring macro cells Cell1 and Cell3, and femto cells Cell01 and Cell02 are set. In a case where a source cell is the macro cell Cell3, counters of neighboring macro cells Cell1 and Cell2, and femto cells Cell01 and Cell02 are arranged. A counter may also be arranged for a femto cell as a source.

In a case of a report where RSRQ (RSRP) is greater than or equal to a predetermined preset value, the counter of the corresponding cell (the number of reports of the cell) is incremented. For example, in the source cell Cell1, in a case where there are N reports that the received quality of an interference signal from the neighboring macro cell Cell2 is greater than or equal to a predetermined preset value, the value of the counter Nm12 of FIG. 7A is increased by +N.

In a case where a counter value (Nmxx) of a neighboring macro cell is greater than or equal to the predetermined preset value, optimization such as macro cell coverage optimization and interference optimization is performed.

In a case where, even if a counter value (Nfxx) of a neighboring femto cell is greater than or equal to a predetermined preset value, the counter value (Nmxx) of the neighboring macro cell is less than the predetermined preset value, optimization such as macro coverage optimization and interference optimization is not performed. In this case, macro-femto interference optimization may be performed, or femto cell coverage optimization or the like may be performed.

Fourth Exemplary Embodiment

The following describes a fourth exemplary embodiment of the present invention. It is assumed to adopt a scheme (Logged MDT (Minimization Drive Test)) in which a radio terminal (UE) performs measurement during an idle mode, and reports a measurement result to a radio network during an active mode, as specified in the specification of Non Patent Literature 5. It is to be noted that a scheme (Immediate MDT) in which a radio terminal performs measurement and reports a measurement result to a radio terminal during an active mode, as defined similarly in the specification of Non Patent Literature 5, can be applied to the above described exemplary embodiments.

The idle mode is a mode in which a UE, in a power ON state, has not yet established a Radio Resource Control (RRC) connection, such as in a standby mode or the like (Non Patent Literature 8). The idle mode indicates RRC_IDLE (Radio Resource Control IDLE) in LTE and UTRAN IDLE in UMTS (Universal Mobile Telecommunications System). It is to be noted that when the UE is in an idle mode, management of which cell area the radio terminal (UE) is in the service area, is not performed on a radio network side; but management of which Tracking Area (TA), Location Area (LA) and Routing Area (RA), the radio terminal (UE) belongs to, is performed on the radio network side. The tracking area is managed by an MME (Mobility Management Entity) or the like.

An active mode indicates RRC_CONNECTED in LTE, and CELL_DCH in UMTS. CELL_DCH is an RRC state where a dedicated physical channel is assigned to the radio terminal (UE) for uplink and downlink, and the radio terminal (UE) and a radio base station are connected by individual channels to perform reception and transmission.

In Logged MDT, as contents measured by the radio terminal (UE) in an idle mode, the following are used:
received quality of a downlink pilot signal (reference signal) of a serving cell,
received quality of a downlink pilot signal (reference signal) of a nearby (neighboring) cell and the like.
That is, the radio terminal (UE) measures received quality of a downlink reference signal (pilot signal) from a base station of the abovementioned cell. It is to be noted that in LTE the following are used as received quality:
RSRP (Reference Signal Received Power: received power of a downlink desired reference signal),
RSRQ (Reference Signal Received Quality: received power of a downlink desired reference signal divided by downlink total received power), and the like. RSSI is a total received power in a radio terminal.

In Logged MDT, contents reported by the radio terminal (UE) to a radio network side includes:
an identifier of a serving cell (ECGI: E-UTRAN Cell Global Identifier) and received quality (RSRP, RSRQ) of a downlink pilot signal,
received quality of a downlink pilot signal of a nearby (neighboring) cell,
measurement time (relative time from time when the radio terminal (UE) receives a measurement instruction),
location information (valid GNSS (Global Navigation Satellite System) location information held at the time of measurement) and the like. Here, in a case where the measurement time at the radio terminal is within a predetermined preset time from the time of acquiring the GNSS location information at the radio terminal, the radio terminal determines that the GNSS location information is valid. In a case where the radio terminal (UE) does not have valid GNSS location information, instead of the GNSS location information, reports of the following are made as the location information: PCI (Physical Cell Identifier)/PSC (Primary Scrambling Code)+RSRP/CPICH RSCP (Common Pilot Channel Received Signal Code Power) (physical cell identification information of a nearby (neighboring) cell+received quality of a downlink pilot signal of a nearby (neighboring) cell).

A radio base station/base station control station ((e)NodeB/RNC) of an (E-)UTRAN instructs a radio terminal (UE) in an active mode to execute measurement in an idle mode and to record a measurement result (logging). That is, in order to transfer a configuration parameter of a Logged MDT performed in an idle mode, the radio network starts a Logged MDT procedure by transmitting an idle MDT configuration message to the radio terminal (UE).

After transitioning from an active mode to an idle mode, the radio terminal executes measurement in the idle mode and logging, in accordance with an instruction from the radio network ((E-)UTRAN). Here, a cell that is a target for measurement is basically the same as a UE in a normal idle mode. That is, measurement by a Logged MDT is executed in accordance with a radio terminal (UE) idle mode measurement principle as specified in 3GPP TS 25.133, TS 36.133, and the like. A measurement target includes, in addition to a serving cell,
cell(s) included in a neighboring cell list,
cell(s) outside of the neighboring cell list detected by a UE (detected cell(s)).

In a case where the radio terminal (UE) resides in a coverage hole, logging as "Out Of Service" (OOS) is under investigation instead of logging a measurement result of a serving cell and neighboring cell (Non Patent Literature 6). In a case where the radio terminal (UE) resides in a coverage hole, MDT measurement and logging are continued only in a specific period (for example, during when a terminal is in a "camped normally" state). In a case where the radio terminal (UE) remains in a coverage hole even after the specific period has elapsed (for example, while the terminal is in an "any cell selection" or "camped on any cell" state), suspending MDT measurement and logging is also under investigation (Non Patent Literature 5). It is to be noted that in case at a point in time of returning again to a "camped normally" state, idle MDT configuration is valid, MDT measurement and logging is restarted.

Here, a coverage hole indicates an area in which, with regard to a serving cell or a neighboring cell for which serving (referred to as "connecting", "establishing a radio link") is permitted in order to receive (perform) a predetermined service, for example, a normal service (make a call, receive a call, transmit and receive user data, and the like), SNR (Signal to Noise Ratio) or SINR (Signal to Interference and Noise Ratio) thereof is less than or equal to a preset value necessary for maintaining a basic service (establishing a SRB (Signaling Radio Bearer), and acquiring information transmitted on a DL common channel (downlink common channel)). Here, the SRB is a bearer for carrying an RRC (radio resource control) message, which is a control message.

It is to be noted that with regard to the point in time at which the radio terminal (UE) determines a coverage hole, the following may be cited as examples:
a case where it was not possible to select a cell by which the radio terminal (UE) is permitted to be served during a "camped normally" state (paging information could not be acquired),
a case where it was not possible to select a cell by which the radio terminal (UE) is permitted to be served during an "any cell selection" state,
a case where it was not possible to select a cell by which the radio terminal (UE) is permitted to be served during a "camped on any cell" state and the like.
In the present specification, as an example, a coverage hole is determined in a case where it was not possible to select a cell by which the radio terminal (UE) is permitted to be served during a "camped normally" state.

The radio terminal (UE) configured with the Logged MDT, performs measurement in an idle mode, and when the radio terminal (UE) is in an active mode, the radio terminal (UE) reports a measurement result. The radio terminal (UE), which is configured from a radio network side so as to execute a Logged MDT in an idle mode, uses 1 bit in an RRC_CONNECTION Setup Complete message, when an RRC connection is established, in a case of transitioning to an RRC_CONNECTED state, for example, to indicate that an MDT measurement result can be used (that a log is held). The radio network retrieves the log based on the indication. For example, a radio base station (eNB) of an E-UTRAN transmits a radio terminal (UE) information request to the radio terminal (UE) for a log search (retrieval), and the radio terminal (UE) reports the log as a UE Information Response. In this way, it is possible for the eNB or OAM/SON server to grasp a coverage problem.

Reporting a log (measurement report) that is held, from a radio terminal, being a search (retrieval) of the log (measurement report) held by the radio terminal (UE) from a network, is referred to as log retrieval in the present specification.

FIG. 8 is a diagram illustrating sequence operations of a fourth exemplary embodiment of the present invention. The eNB1 instructs the UE1 to UEn in an active mode (RRC_CONNECTED) to perform measurement and recording (logging) of received quality when in an idle mode and report a log of a measurement result when in an active mode, by a Logged MDT configuration message (S20, S21). The UE1 to UEn go into an idle mode (S22, S24: Go to idle), and perform measurement and logging of serving cells and neighboring cells (S23, S25: Measurement and logging).

Next, a UE1 detects deterioration in received quality of the base station eNB1 of a serving cell, and detects that the area in which UE1 resides is a coverage hole (S26: Coverage hole detection). It is to be noted that when a coverage hole is detected, the UE1 may or may not perform measurement of the cells eNB1 and eNB2. In addition, UE may perform measurement of the cell of a HeNB. It is to be noted that these measurements may be performed autonomously by UE1 to UEn. Alternatively, an instruction may be given to the UE1 to UEn using a Logged MDT configuration message. In addition, an instruction may be given to perform measurement regarding the HeNB. On the other hand, measurement of the cells of the eNB1, eNB2 and HeNB may be performed during a preset time until detection of a coverage hole, and the measurement may be suspended after a preset period (that is, after coverage hole detection).

It is assumed the thereafter UE1 detects an appropriate cell (S27: Find suitable cell) (here, the eNB1 is detected). It is to be noted that as a cell detection method by the UE, a well known method may be used (Non Patent Literature 7).

Thereafter, the UE1 to UEn respectively establish a radio link (RRC Connection) with the eNB1, go into an active mode (S28, S29: Go to Active), and respectively report a measurement result to the base station eNB1 (S30, S31: Measurement retrieval).

The eNB1 reports the measurement result reported by each of UE1 to UEn to the OAM/SON server (S32: Report).

In the OAM/SON server, filter processing is performed to classify the measurement reports into macro cell, femto cell, and the like (S33: Measurement report filtering). In this way, the OAM/SON server decides optimization processing such as inter-macro cell coverage optimization and interference optimization, and macro cell-femto cell interference optimization (S34: Optimization process decision).

The OAM/SON server instructs the eNB1 to adjust for optimization (S35: Adjust for optimization). The eNB1 receives the adjustment instruction for optimization, adjusts a radio network configuration (setting of radio parameters or network operation parameters), and performs coverage optimization, interference optimization, and the like (S36: Optimization).

When the UE1 detects a coverage hole in the macro cell of the eNB1, in a case where the reason for the coverage hole is interference from a base station HeNB of a femto cell that is a neighboring cell, macro-femto interference optimization is performed instead of shrinking cell size. In this way, it is possible to prevent unnecessary shrinkage of the coverage of the macro cell, and generation of a coverage hole (blind zone). Thus, according to the present exemplary embodiment, based on the measurement report from the UE for which the Logged MDT is configured, it is possible to determine the reason for interference for a coverage hole, and to take measures such as coverage optimization, interference optimization, and the like.

<Another Example of an Algorithm for Coverage Optimization, Interference Optimization>

FIGS. 9A, 9B and 9C are diagrams illustrating another example of coverage optimization and interference optimization (an example different from the algorithm described above). Referring to FIGS. 9A, 9B and 9C, a description is given of the other example of coverage optimization and interference optimization.

In FIGS. 9A, 9B and 9C, the radio terminals UEa and UEb in macro cell respectively transmit a measurement report to the eNB1 and the eNB3 (1a, 1b: Meas report).

Here, the UEa receives interference from neighboring cells Cell2 and Cell3, and from a femto cell inside cell Cell1, and among these, the interference from the femto cell is dominant.

Furthermore, the UEb receives interference from neighboring macro cells Cell1 and Cell2, and among these, the interference from the macro cell Cell2 is dominant.

At this time, the OAM/SON server decides a method of dealing with the optimization, based on information of a measurement report from each eNB (2a: Report).

Even if the eNB1 receives many reports in which the interference of the femto cell, as in UEa, is dominant, the OAM/SON server does not make a change to a radio parameter for coverage optimization of Cell1.

On the other hand, in a case where the eNB3 receives many reports in which the interference of the neighboring macro cell Cell2 is dominant, as in UEb, the OAM/SON server changes a radio parameter configuration of the base station of Cell3, and devises coverage optimization. For example, in order to decrease interference from Cell2, coverage of Cell3 is shrunk (4b: Shrink coverage of Cell3).

In a case where the eNB1 receives many reports in which the interference of the femto cell is dominant, as in UEa, optimization of interference between Cell1 and the cell of the HeNB, and among the femto cells is performed. Or, coverage optimization of the femto cell may also be performed.

Here, as a method of realizing the interference avoidance:
the OAM/SON server may send an instruction to perform interference optimization to the eNB1, and the eNB1 may execute interference avoidance technique, independently or in collaboration with the HeNB, or,
the OAM/SON server may send an instruction to both the eNB1 and the HeNB, and may execute interference avoidance technique for each thereof.

More specifically, radio resources used in the macro cell Cell1 by the eNB1 and radio resources used in the femto cell by the HeNB are separated (time, frequency, code and the like). In an example of FIG. 9B, a subframe used in Cell1 and a subframe used in the femto cell are separated. It is to be noted that in Cell1 a usage restriction need not be provided regarding the subframe, but a usage restriction may be provided only in the femto cell side, and conversely, in the femto cell a usage restriction need not be provided regarding the subframe, but a usage restriction may be provided only in the Cell1 side.

Alternatively, a frequency band used by the HeNB in the femto cell may be narrowed. In the example of FIG. 9C, the frequency band of the femto cell is reduced to half the high frequency side. It is to be noted that with regard to the frequency band, a system band itself may be narrowed, or only a band in which data is transmitted may be narrowed. (However, in this case, a common control signal or the like is sent in a band the same as before the frequency is narrowed).

Alternatively, the eNB1 decreases maximum transmission power set in Cell1, and/or the HeNB decreases maximum transmission power set in the femto cell. The reduction in the maximum transmission power may be for both a reference signal and data, and may be for a reference signal only or data only.

<Distinguishing type of Neighboring Cell>

The following describes an example of distinguishing the type of a neighboring cell in a Heterogeneous Network (HetNet).

1) In a HetNet environment (general), a neighboring cell is distinguished as a macro/micro/pico/H(e)NB, by a PCI/PSC.

2) When there is also CSG (Closed Subscriber Group) cells (H(e)NB), (a case where a CSG cell is not in a Black list), a decision is made as to whether or not a neighboring cell is a non-member CSG cell, from information of the ID of a radio terminal (UE) that makes a measurement report and CSG information linked to the ID (member of which CSG cell?), and from PCI/PSC and CSG ID linked to the PCI/PSC.

3) In a case where there is also CSG cells (H(e)NB) (in a case where a CSG cell is in a Black list, or a case of not being a member of any CSG cell, and it is determined that a neighboring cell is a CSG cell by a PCI/PSC), an RSRQ of a serving cell is lower than a predetermined preset threshold, and in addition a maximum (or as far as the upper N-th) RSRP of a neighboring cell is lower than a predetermined preset threshold, it is determined that there is (was) a non-member CSG cell with strong interference in the vicinity.

It is to be noted that the black list is a list which causes a radio terminal (UE) not to perform a measurement (quality measurement) of a specific neighboring cell.

The CSG cell limits an access to a specific group, such as the owner of a femto cell or family, for example.

It is to be noted that in the above 3), since the radio terminal (UE) does not measure a CSG cell, the determination by the PCI/PSC is not possible.

Fifth Exemplary Embodiment

The following describes a fifth exemplary embodiment of the present invention. In the present exemplary embodiment, a radio terminal (UE) distinguishes the type of a neighboring cell, performs a measurement and reports a measurement result. In the background, in order to grasp coverage (also called as "coverage mapping") on a radio network side, it is desirable to retrieve as many measurement reports as possible from the radio terminal (UE). However, there is a problem in that if the measurement reports from the radio terminal (UE) increase, uplink messages (signaling) to a base station eNB from the radio terminal (UE) for the measurement reporting increase, and radio resources that can be used in uplink data transmission decrease. Furthermore, there is a problem in that performing many measurements and measurement reports incurs increase in battery power consumption increases in the radio terminal (UE). In addition, from a radio network side point of view, among the measurement reports from the radio terminal (UE), not all the reports of measurement results are necessary. That is, on the radio network side, it is assumed that reporting of measurement results in a specific situation is necessary. In this case, execution of measurement of unnecessary (low necessity) information and reporting of the measurement results thereof is not meaningful so much.

In order to solve these problems, in the present exemplary embodiment a measurement target or a measurement result is distinguished on a radio terminal (UE) side, measurement and reporting of the measurement results is performed. The following may be used, as examples, in determining whether or not a measurement target and/or a measurement result is a reporting target:

type of cell (a macro cell/micro/pico or femto cell (open, closed, hybrid) in a Heterogeneous Network (HetNet)), whether this is a cell in a neighboring cell list, a cell outside the neighboring cell list, or a cell of a black list, and the like.

A radio base station (eNB) (or a base station control station: RNC) gives an instruction that a measurement and a report of a measurement result is to be made for a cell of a specific type, to the radio terminal (UE).

In case the radio terminal (UE) is made to perform measurement and reporting of the measurement result for a cell of a specific type, the radio terminal (UE) follows the instruction and performs measurement of received quality of a serving cell and a nearby (neighboring) cell of a type specified by the instruction, and reports the measurement result to the radio base station (eNB).

In case the radio terminal (UE) is made to report the measurement result for a cell of a specific type, the radio terminal (UE) is made to, irrespective of the cell type, perform measurement of received quality of the serving cell and neighboring cell that are targets for measurement, and when reporting the measurement result, make a decision as to whether or not a cell of a specific type that is a target for reporting is involved, and report only a relevant measurement result. In this way, it is possible to avoid (reduce) usage of uplink radio resources for reporting an unnecessary (low necessity) measurement report by the radio terminal, and to avoid (reduce) battery consumption by performing an unnecessary (low necessity) measurement and/or reporting an unnecessary (low necessity) measurement result by the radio terminal. Furthermore, it is possible to efficiently retrieve a necessary measurement result on the radio network side.

<Distinguishing of Type of Neighboring Cell by Radio Terminal>

The following describes an example of distinguishing the type of neighboring cell by a radio terminal in a Heterogeneous Network (HetNet).

1) When there is also CSG cells (H(e)NB) (in a case where a CSG cell is not in a Black list), a PCI/PSC of a CSG cell, by which a radio terminal was served in the past, is stored, and a decision is made as to whether or not a neighboring cell is a member CSG cell according to the PCI/PSC in question. It is to be noted that with this method, in order to make a more strict decision, other information is necessary, as in:

not only the PCI/PSC, whether a tracking area is the same as that in which a member CSG cell is present, whether a serving cell is a cell in the vicinity of a member CSG cell, and the like. Furthermore, in a case where the radio terminal (UE) is non member of any CSG cells, and in a case where it is possible to determine whether or not this is a CSG cell by the PCI/PSC, a decision is made as to whether or not this is a CSG cell (in this case, a non-member) by the detected PCI/PSC.

2) In a case of a mix of CSG cells (H(e)NB), (a case where a CSG cell is in a black list, or a case of non-membership of a CSG cell, but it is possible to decide that a neighboring cell is a CSG cell by the PCI/PSC), a case where an RSRQ of a serving cell is lower than a predetermined preset threshold, in addition, a maximum (or as far as an upper N-th) RSRP of a neighboring cell is lower than a predetermined preset threshold, a decision is made that there is a non-member CSG cell with strong interference in the vicinity. It is to be noted that with this method, a measurement report of interference (received quality) of the CSG cell is not made, but instead a notification of "a CSG cell with strong interference is present" may be made.

The respective disclosures of the Non Patent Literatures described above are hereby incorporated by reference into this specification. The exemplary embodiments and examples may be changed and adjusted within the scope of the entire disclosure (including the scope of the claims) of the present invention and based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

What is claimed is:

1. A radio communication system wherein the system comprises:
    a first radio station;
    a second radio station of a same type to the first radio station and a third radio station of a different type from the first radio station;
    a radio terminal served by the first radio station; and
    an operation administration and maintenance server that exchanges configuration information with at least one of the first, the second, or the third radio stations,
    wherein the first radio station instructs the radio terminal to measure received quality of a downlink signal from at least one of the second or the third radio station,
    the radio terminal performs the measurement in accordance with the instruction,
    at least one of the first radio station and the operation administration and maintenance server comprises
    a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
    wherein based on one or more measurement reports by the radio terminal, in a case where
    an interference or a received quality of an interference signal from the second radio station is less than or equal to a predetermined first preset level, and
    an interference or a received quality of an interference signal from the third radio station is greater than or equal to a predetermined second preset level,
    at least one of the first radio station and the operation administration and maintenance server makes no change to the radio network configuration.

2. The radio communication system according to claim 1, wherein a preset offset is provided between the first preset level and the second preset level.

3. A radio communication system wherein the system comprises:
    a first radio station;
    a second radio station of a same type to the first radio station and a third radio station of a different type from the first radio station;
    a radio terminal served by the first radio station; and
    an operation administration and maintenance server that exchanges configuration information with at least one of the first, the second, or the third radio stations,
    wherein the first radio station instructs the radio terminal to measure received quality of a downlink signal from at least one of the second or the third radio station,
    the radio terminal performs the measurement in accordance with the instruction,
    at least one of the first radio station and the operation administration and maintenance server comprises
    a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
    wherein based on one or more measurement reports by the radio terminal, in a case where
    an interference or a received quality of an interference signal from the second radio station is less than or equal to a predetermined first preset level, and
    an interference or a received quality of an interference signal from the third radio station is greater than or equal to a predetermined second preset level,
    at least one of the first radio station and the operation administration and maintenance server executes optimization of inter-cell interference between the first radio station and the third radio station with priority over optimization of coverage of at least one of the first radio station and the second radio station.

4. A radio communication system wherein the system comprises:
    a first radio station;
    a second radio station of a same type to the first radio station and a third radio station of a different type from the first radio station;
    a radio terminal served by the first radio station; and
    an operation administration and maintenance server that exchanges configuration information with at least one of the first, the second, or the third radio stations,
    wherein the first radio station instructs the radio terminal to measure received quality of a downlink signal from at least one of the second or the third radio station,
    the radio terminal performs the measurement in accordance with the instruction,
    at least one of the first radio station and the operation administration and maintenance server comprises a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station, wherein based on one or more measurement reports by the radio terminal, in a case where the number of reports stating that an interference or a received quality of an interference signal from the second radio station is greater than or equal to a predetermined third preset level, are less than a predetermined first preset threshold, and the number of reports stating that an interference or a received quality of an interference signal from the third radio station is greater than or equal to a predetermined fourth preset level, are greater than or equal to a predetermined second preset threshold, at least one of the first radio station and the operation administration and maintenance server makes no change to the radio network configuration.

5. The radio communication system according to claim 4, wherein a preset offset is provided between the third preset level and the fourth preset level.

6. The radio communication system according to claim 4, wherein based on one or more measurement reports by the radio terminal, in a case where;

among the reports stating that a received quality of the neighboring cell is greater than or equal to the predetermined preset value, the number of the neighboring cells, each being a macro cell, is greater than or equal to the predetermined preset number, at least one of the first radio station and the operation administration and maintenance server executes coverage optimization by increase or decrease of coverage, while in a case where;

the number of the neighboring cells, each being a femto cell, is greater than or equal to the predetermined preset number, at least one of the first radio station and the operation administration and maintenance server executes avoidance of interference from the femto cell.

7. A radio communication system comprising:
a first radio station;
a second radio station of a same type to the first radio station and a third radio station of a different type from the first radio station;
a radio terminal served by the first radio station; and
an operation administration and maintenance server that exchanges configuration information with at least one of the first, the second, or the third radio stations,
wherein the first radio station instructs the radio terminal to measure received quality of a downlink signal from at least one of the second or the third radio station,
the radio terminal performs the measurement in accordance with the instruction,
at least one of the first radio station and the operation administration and maintenance server comprises
a unit that receives a report of a measurement result by the radio terminal, identifies, from the report, a type of the radio station, and performs at least one of determining whether or not a change is to be made to a radio network configuration of at least one radio station of the first to third radio stations, and changing the radio network configuration, wherein based on one or more measurement reports by the radio terminal, in a case where the number of reports stating that an interference or a received quality of an interference signal from the second radio station is greater than or equal to a predetermined third preset level, are less than a predetermined first preset threshold, and the number of reports stating that an interference or a received quality of an interference signal from the third radio station is greater than or equal to a predetermined fourth preset level, are greater than or equal to a predetermined second preset threshold, at least one of the first radio station and the operation administration and maintenance server executes optimization of inter-cell interference between the first radio station and the third radio station with priority over optimization of coverage of at least one of the first radio station and the second radio station.

8. A radio communication system wherein the system comprises:
a first radio station;
a second radio station of a same type to the first radio station and a third radio station of a different type from the first radio station;
a radio terminal served by the first radio station; and
an operation administration and maintenance server that exchanges configuration information with at least one of the first, the second, or the third radio stations,
wherein the first radio station instructs the radio terminal to measure received quality of a downlink signal from at least one of the second or the third radio station,
the radio terminal performs the measurement in accordance with the instruction,
at least one of the first radio station and the operation administration and maintenance server comprises
a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
wherein a change in the radio network configuration by at least one of the first radio station and the operation administration and maintenance server is intended for optimization of at least one of coverage and inter-cell interference,
wherein the first and second radio stations are macro cell base stations,
the third radio station is a femto cell base station,
the radio terminal, responsive to a measurement instruction from the first radio station, measures received quality of a downlink signal of a serving macro cell and a neighboring cell, and reports a measurement result to the first radio station, the first radio station transmits the report received from the radio terminal to the operation administration and maintenance server, the operation administration and maintenance server aggregates contents of measurement reports transmitted via the first radio station from the radio terminal, per type of a neighboring cell that is a target of the measurement, based on the contents of measurement reports aggregated per type of a neighboring cell, in a case where among the reports stating that a received quality of a neighboring cell is greater than or equal to a predetermined preset value, the number of the neighboring cells, each being a macro cell, is greater than or equal to a predetermined preset number, the operation administration and maintenance server determines that optimization of the macro cell is necessary, and in a case where among the reports stating that a received quality of a neighboring cell is greater than or equal to the predetermined preset value, the number of the neighboring cells, each being a femto cell, is greater than or equal to the predetermined preset number, the operation administration and maintenance server determines that optimization of the femto cell is necessary, the operation administration and maintenance server instructing at least one relevant radio station among the first, the second, and the third radio stations to adjust the radio network configuration in order to optimize at least one of coverage and inter-cell interference.

9. A radio communication system wherein the system comprises:
   a first radio station;
   a second radio station of a same type to the first radio station and a third radio station of a different type from the first radio station;
   a radio terminal served by the first radio station; and
   an operation administration and maintenance server that exchanges configuration information with at least one of the first, the second, or the third radio stations,
   wherein the first radio station instructs the radio terminal to measure received quality of a downlink signal from at least one of the second or the third radio station,
   the radio terminal performs the measurement in accordance with the instruction,
   at least one of the first radio station and the operation administration and maintenance server comprises
   a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
   wherein a change in the radio network configuration by at least one of the first radio station and the operation administration and maintenance server is intended for optimization of at least one of coverage and inter-cell interference,
   wherein the first and second radio stations are macro cell base stations,
   the third radio station is a femto cell base station,
   the radio terminal, on receipt of an measurement instruction over a radio from the first radio station, measures received quality of a serving macro cell and a neighboring cell, and reports a measurement result to the first radio station,
   the first radio station aggregates contents of measurement reports transmitted from the radio terminal, per type of a neighboring cell that is a target of the measurement, and then reports to the operation administration and maintenance server,
   based on the contents of measurement reports aggregated per type of a neighboring cell, in a case where
   among the reports stating that a received quality of a neighboring cell is greater than or equal to a predetermined preset value, the number of the neighboring cells, each being a macro cell, is greater than or equal to a predetermined preset number,
   the operation administration and maintenance server determines that optimization of the macro cell is necessary, and
   in a case where
   among the reports stating that a received quality of a neighboring cell is greater than or equal to the predetermined preset value, the number of the neighboring cells, each being a femto cell, is greater than or equal to the predetermined preset number,
   the operation administration and maintenance server determines that optimization of the femto cell is necessary,
   the operation administration and maintenance server instructing at least one relevant radio station among the first, the second and the third radio stations to adjust the radio network configuration in order to optimize at least one of coverage and inter-cell interference.

10. A radio communication system wherein the system comprises:
    a first radio station;
    a second radio station of a same type to the first radio station and a third radio station of a different type from the first radio station;
    a radio terminal served by the first radio station; and
    an operation administration and maintenance server that exchanges configuration information with at least one of the first, the second, or the third radio stations,
    wherein the first radio station instructs the radio terminal to measure received quality of a downlink signal from at least one of the second or the third radio station,
    the radio terminal performs the measurement in accordance with the instruction,
    at least one of the first radio station and the operation administration and maintenance server comprises
    a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station, wherein the first and second radio stations are macro cell base stations, the third radio station is a femto cell base station, the radio terminal receives over a radio an instruction of measurement from the first radio station, measures received quality of a serving macro cell and a neighboring cell, and reports a measurement result to the first radio station, the first radio station aggregates contents of measurement reports transmitted from the radio terminal per type of a neighboring cell that is a target of the measurement, and in a case where a decision is made that optimization by the first radio station is necessary, executes optimization and then reports to the operation administration and maintenance server, based on the contents of measurement reports aggregated per type of a neighboring cell, in a case where among the reports stating that a received quality of a neighboring cell is greater than or equal to a predetermined preset value, the number of the neighboring cells, each being a macro cell, is greater than or equal to a predetermined preset number, the operation administration and maintenance server determines that optimization of the macro cell is necessary, and executes optimization, and in a case where among the reports stating that a received quality of a neighboring cell is greater than or equal to the predetermined preset value, the number of the neighboring cells, each being a femto cell, is greater than or equal to a predetermined preset number, the operation administration and maintenance server determines that optimization of the femto cell is necessary, the operation administration and maintenance server instructing the corresponding second radio station or the corresponding third radio station to adjust the radio network configuration in order to perform optimization.

11. A radio communication system wherein the system comprises:

a first radio station;

a second radio station of a same type to the first radio station and a third radio station of a different type from the first radio station;

a radio terminal served by the first radio station; and an operation administration and maintenance server that exchanges configuration information with at least one of the first, the second, or the third radio stations, wherein the first radio station instructs the radio terminal to measure received quality of a downlink signal from at least one of the second or the third radio station, the radio terminal performs the measurement in accordance with the instruction, at least one of the first radio station and the operation administration and maintenance server comprises a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station, wherein the first and second radio stations are macro cell base stations, the third radio station is a femto cell base station, based on one or more measurement reports by the radio terminal, in a case where the number of reports stating that a received quality (RSRP (Reference Signal Received Power), RSRQ (Reference Signal Received Quality)) of a downlink reference signal from a base station of a femto cell which is a neighboring cell of a cell of the first radio station is greater than or equal to a predetermined preset value, is greater than or equal to a predetermined preset number, and the number of reports stating that a received quality (RSRP, RSRQ) of a downlink reference signal from a base station of a macro cell which is a neighboring cell of a cell of the first radio station is greater than or equal to a predetermined preset value, is less than the predetermined preset number, coverage increase or decrease, or interference avoidance between macro cells is not performed, and in a case where the number of reports stating that a received quality (RSRP, RSRQ) of a downlink reference signal from a base station of the neighboring macro cell is greater than or equal to a predetermined preset value, is greater than or equal to the predetermined preset number, optimization for coverage increase or decrease of macro cell, or interference avoidance are performed.

12. A radio communication system wherein the system comprises:

a first radio station;

a second radio station of a same type to the first radio station and a third radio station of a different type from the first radio station;

a radio terminal served by the first radio station; and an operation administration and maintenance server that exchanges configuration information with at least one of the first, the second, or the third radio stations, wherein the first radio station instructs the radio terminal to measure received quality of a downlink signal from at least one of the second or the third radio station, the radio terminal performs the measurement in accordance with the instruction, at least one of the first radio station and the operation administration and maintenance server comprises a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station, wherein the radio terminal performs measurement and recording in an idle mode, and after detecting a coverage hole in an idle mode, establishes a radio link with the first radio station, goes to an active mode, and reports a measurement result to the first radio station.

13. A radio communication system wherein the system comprises:
a first radio station;
a second radio station of a same type to the first radio station and a third radio station of a different type from the first radio station;
a radio terminal served by the first radio station; and
an operation administration and maintenance server that exchanges configuration information with at least one of the first, the second, or the third radio stations,
wherein the first radio station instructs the radio terminal to measure received quality of a downlink signal from at least one of the second or the third radio station,
the radio terminal performs the measurement in accordance with the instruction,
at least one of the first radio station and the operation administration and maintenance server comprises
a unit that receives a report of a measurement result by the radio terminal, identifies, from the report, a type of the radio station, and performs at least one of determining whether or not a change is to be made to a radio network configuration of at least one radio station of the first, the second, or the third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
wherein the first and second radio stations are macro cell base stations,
the third radio station is a femto cell base station,
even if the number of reports received by the first radio station, wherein the reports stating that femto cell interference is dominant, is greater than or equal to a first predetermined preset number, the first radio station makes no change to a radio network configuration for macro cell coverage optimization, and
in a case where the number of reports received by the first radio station, wherein the reports stating that neighboring macro cell interference is dominant, is greater than or equal to a second predetermined preset number, the first radio station changes a radio network configuration of a base station of the neighboring macro cell and performs coverage optimization, wherein the first predetermined preset number is the same as or different than the second predetermined preset number.

14. A radio communication method comprising:
instructing a radio terminal from a first radio station, to measure interference received from at least one radio station that is at least one of a second radio station of a same type to the first radio station, and a third radio station of a different type from the first radio station;
the radio terminal performing measurement in accordance with the instruction; and
receiving, by at least one of the first radio station and an operation administration and maintenance server, a report of a measurement result by the radio terminal, identifying a type of the radio station from the report, and performing at least one of determining whether or not to change a radio network configuration of at least one radio station of the first to third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
wherein based on one or more measurement reports by the radio terminal, in a case where an interference or a received quality of an interference signal from the second radio station is less than or equal to a predetermined first preset level, and
an interference or a received quality of an interference signal from the third radio station is greater than or equal to a predetermined second preset level,
at least one of the first radio station and the operation administration and maintenance server making no change to the radio network configuration, or, at least one of the first radio station and the operation administration and maintenance server performing optimization of inter-cell interference between the first radio station and the third radio station with priority over optimization of coverage of at least one of the first radio station and the second radio station.

15. A radio communication method comprising:
instructing a radio terminal from a first radio station, to measure interference received from at least one radio station that is at least one of a second radio station of a same type to the first radio station, and a third radio station of a different type from the first radio station;
the radio terminal performing measurement in accordance with the instruction; and
receiving, by at least one of the first radio station and an operation administration and maintenance server, a report of a measurement result by the radio terminal, identifying a type of the radio station from the report, and performing at least one of determining whether or not to change a radio network configuration of at least one radio station of the first to third radio stations, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
the operation administration and maintenance server aggregating contents of measurement reports transmitted via the first radio station from the radio terminal, per type of a neighboring cell that is a target of the measurement,
based on the contents of measurement reports aggregated per type of a neighboring cell, in a case among the reports stating that a received quality of a neighboring cell is greater than or equal to a predetermined preset value, the number of the neighboring cells, each being a macro cell, is greater than or equal to a predetermined preset number, the operation administration and maintenance server determining that optimization of the macro cell is necessary,
in a case where among the reports stating that a received quality of a neighboring cell is greater than or equal to the predetermined preset value, the number of the neighboring cells, each being a femto cell, is greater than or equal to the predetermined preset number, the operation administration and maintenance server determining that optimization of the femto cell is necessary, and
the operation administration and maintenance server instructing at least one relevant radio station among the first, the second, and the third radio stations, to adjust the radio network configuration in order to optimize at least one of coverage and inter-cell interference.

16. A first radio station comprising:
a unit that instructs a radio terminal to measure interference received from at least one radio station that is at least one of a second radio station of a same type to the first radio station and a third radio station of a different type from the first radio station; and
a unit that receives a report of a measurement result from the radio terminal, identifies a type of the radio station from the report, and executes at least one of determining whether or not to change a radio network configuration of at least one of the first radio station, the second radio station, and the third radio station, and changing the radio network configuration, wherein at least one of the first radio station and an operation administration and maintenance server executes optimization of inter-cell interference between the first radio station and the third radio station with priority over optimization of coverage of at least one of the first radio station and the second radio station,
wherein based on one or more measurement reports by the radio terminal, in a case where an interference or a received quality of an interference signal from the second radio station is less than or equal to a predetermined first preset level, and
a received quality of at least one of an interference signal and interference from the third radio station is greater than or equal to a predetermined second preset level,
the first radio station makes no change to the radio network configuration, or, performs optimization of inter-cell interference between the first radio station and the third radio station with priority over optimization of coverage of at least one of the first radio station and the second radio station.

17. A operation administration and maintenance server apparatus comprising:
a unit that receives a report of a measurement result by a radio terminal via a first radio station that instructs the radio terminal to measure interference received from at least one radio station that is at least one of a second radio station of a same type to the first radio station and a third radio station of a different type from the first radio station, identifies a type of the radio station from the report, and
a unit that performs at least one of determining whether or not to change a radio network configuration of at least one radio station of the first radio station, the second station, or the third radio station, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
wherein based on one or more measurement reports by the radio terminal, in a case where an interference or a received quality of an interference signal from the second radio station is less than or equal to a predetermined first preset level, and
an interference or a received quality of an interference signal from the third radio station is greater than or equal to a predetermined second preset level,
the operation administration and maintenance server apparatus makes no change to the radio network configuration, or, executes optimization of inter-cell interference between the first radio station and the third radio station with priority over optimization of coverage of the first radio station and/or the second radio station.

18. A operation administration and maintenance server apparatus comprising:
a unit that receives a report of a measurement result by a radio terminal via a first radio station that instructs the radio terminal to measure interference received from at least one radio station that is at least one of a second radio station of a same type to the first radio station and a third radio station of a different type from the first radio station, identifies a type of the radio station from the report, and
a unit that performs at least one of determining whether or not to change a radio network configuration of at least one radio station of the first radio station, the second station, or the third radio station, and changing the radio network configuration, wherein at least one of the first radio station and the operation administration and maintenance server executes optimization of inter-cell interference between the first radio station and the third radio station with priority over optimization of coverage of at least one of the first radio station and the second radio station,
wherein based on one or more measurement reports by the radio terminal, in a case where
among the reports stating that a received quality of the neighboring cell is greater than or equal to a predetermined preset value, the number of the neighboring cells, each being a macro cell, is greater than or equal to a predetermined preset number, the operation administration and maintenance server determines that optimization of the macro cell is necessary, and
in a case where
among the reports stating that received quality of the neighboring cell is greater than or equal to the predetermined preset value, the number of the neighboring cells, each being a femto cell, is greater than or equal to the predetermined preset number, the operation administration and maintenance server determines that optimization of the femto cell is necessary,
the operation administration and maintenance server determines giving an instruction to at least one relevant radio station among the first, second and third radio stations, to adjust the radio network configuration in order to optimize at least one of coverage and inter-cell interference.

19. A first radio station comprising:
a transmitter that transmits a first signal, wherein the first signal comprises an instruction adapted to instruct a radio terminal to measure interference received from at least one of a second radio station that is the same type as the first radio station and a third radio station that is a different type than the first radio station; and
a receiver that receives a second signal, wherein the second signal comprises information related to the interference,
wherein the first radio station performs optimization of inter-cell interference between the first radio station and the third radio station, and wherein the optimization of inter-cell interference is prioritized over optimization of coverage of at least one of the first radio station and the second radio station,
wherein the optimization of inter-cell interference is provided when interference from the second radio station is less than or equal to a predetermined first preset level, and interference from the third radio station is greater than or equal to a predetermined second preset level.

20. The first radio station according to claim 19, wherein the first radio station outputs the information related to the interference to a server and receives a third signal from the server, and wherein the first radio station performs the optimization of the inter-cell interference based on the third signal.

21. The first radio station according to claim 19, wherein the first radio station receives a radio configuration instruction from a server.

22. The first radio station according to claim 19, wherein the third radio station comprises a femto cell base station.

23. The first radio station according to claim 22, wherein the second radio station comprises a non-femto cell base station.

* * * * *